United States Patent
Marasco et al.

(10) Patent No.: US 11,997,085 B2
(45) Date of Patent: May 28, 2024

(54) COMPLEX USER AUTHENTICATION FACTOR INTEGRATING A SEQUENCE OF FINGERPRINTS AND A PERSONAL IDENTIFICATION NUMBER

(71) Applicant: GEORGE MASON UNIVERSITY, Fairfax, VA (US)

(72) Inventors: Emanuela Marasco, Alexandria, VA (US); Massimiliano Albanese, Potomac, MD (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 250 days.

(21) Appl. No.: 17/670,590

(22) Filed: Feb. 14, 2022

(65) Prior Publication Data

US 2023/0262054 A1    Aug. 17, 2023

(51) Int. Cl.
*H04L 9/40* (2022.01)

(52) U.S. Cl.
CPC ........ *H04L 63/0861* (2013.01); *H04L 63/083* (2013.01); *H04L 63/102* (2013.01); *H04L 2463/082* (2013.01)

(58) Field of Classification Search
CPC . G06F 21/32; H04L 2463/082; H04L 63/083; H04L 63/0861; H04L 63/102
See application file for complete search history.

(56) References Cited

U.S. PATENT DOCUMENTS

| | | | | |
|---|---|---|---|---|
| 10,037,528 | B2* | 7/2018 | Gardiner | G06V 40/1365 |
| 10,764,280 | B2 | 9/2020 | Kim et al. | |
| 2003/0179910 | A1* | 9/2003 | Wong | G06V 40/1347 |
| | | | | 382/115 |
| 2015/0070323 | A1* | 3/2015 | Hong | H04L 67/1078 |
| | | | | 345/175 |
| 2015/0142647 | A1* | 5/2015 | Johnson | G06Q 20/102 |
| | | | | 705/40 |
| 2017/0063851 | A1* | 3/2017 | Kim | H04W 12/065 |
| 2018/0285539 | A1* | 10/2018 | Agarwal | H04L 9/3231 |
| 2018/0349588 | A1* | 12/2018 | Abdelmoneum | G06F 21/32 |

FOREIGN PATENT DOCUMENTS

KR    10-2017-0025802 A    3/2017

* cited by examiner

*Primary Examiner* — Theodore C Parsons
(74) *Attorney, Agent, or Firm* — TaeRa K. Franklin; Eckert Seamans Cherin & Mellott, LLC

(57) ABSTRACT

A method of authenticating a user that includes initializing the multi-factor authentication system based on an input; presenting a challenge requesting the user to enter a specific authenticator of a sequence of authenticators stored in the multi-factor authentication system, where the stored sequence of authenticators represents a combination of a plurality of authentication factors; receiving an authenticator from the user in response to the challenge; verifying identity of the user by determining whether the received authenticator matches the specific authenticator requested by the challenge; and granting the access based on a determination that the received authenticator matches the specific authenticator requested, or denying the access based on a determination that the received authenticator does not match the specific authenticator requested.

18 Claims, 9 Drawing Sheets

COMPLEX USER AUTHENTICATION FACTOR INTEGRATING A SEQUENCE OF FINGERPRINTS AND A PERSONAL IDENTIFICATION NUMBER

GOVERNMENT CONTRACT

This invention was made with government support under grant number 1822094 awarded by the National Science Foundation. The government has certain rights in the invention.

BACKGROUND OF THE INVENTION

1. Field of the Invention

The present invention relates to a method and system for multi-factor authentication, specifically, to a method and system for authentication using an authentication factor that integrates fingerprints and personal identification numbers (FingerPIN).

2. Description of the Related Art

In this information age, robust authentication mechanisms are critical to protect the security of data applications. Authentication is a process of determining whether a user requesting to access a resource system (e.g., devices, systems, facilities, servers, or any other resources) is who the user claims to be and provides access control by verifying that the user's credentials match the credentials stored in a memory of an authentication system or an authorized user database or server of the resource system. There are several types of authentication factors. Type 1 authentication factor is knowledge-based factor that a user knows, including passwords, personal identification numbers (PINs), combinations, code words, etc. Type 2 authentication factor is possession-based factor that a user has in their possession, including a one-time password token (OTP token) or a smartphone with an OTP app. Type 3 authentication factor is biometric-based factor inherent to who the user is, including fingerprints, palm veins, face, retina, iris, voice, etc. User location (e.g., GPS determined location, IP address, or physical presence) may be considered a Type 4 authentication factor, and log-in time (e.g., verified against the user's work schedule) may be considered a Type 4 or Type 5 authentication factor. However, none of these factors is fail-safe.

For example, while Type 1 knowledge-based authentication factor is the most widely adopted form of authentication, it suffers from credential theft. Most users create passwords that are easy to remember, therefore easy to become compromised via shoulder surfing or social engineering. Further, brute-force attack involving the entry of every combination of letters, numbers, and symbols may further compromise the effectiveness of such passwords. Because passwords and PINs must be memorized, users often choose words that are easier to remember, making them more susceptible to thefts and dictionary attacks. When longer or difficult-to-remember passwords are chosen, users tend to write them down in easily accessible places, effectively defeating the purpose of using authentication. Furthermore, compromising a single password may represent a risk for multiple applications, as users tend to reuse the same passwords across different applications.

Type 2 authentication, e.g., OTP tokens, generally requires additional devices (e.g., smart card, fob, etc.) that may be expensive to license or maintain, and cumbersome for the user to carry. Further, these devices may be lost, break or wear out. Moreover, the technologies or processes for generating the OTP tokens may be inconvenient.

Type 3 authentication, e.g., biometric authentication such as fingerprint authentication, is less likely to suffer from credential theft due to the biometric features being unique to the individual and has been widely adopted in various government and commercial applications (e.g., forensics and criminal investigations, computer network login, ATMs, credit card, medical records management). Despite the high level of security, accuracy and convenience provided by the fingerprint authentication technologies, there are significant concerns regarding the fingerprint-based authentication. For example, an individual's fingerprint is unique to that individual, permanently associated with that individual and thus cannot be replaced. As such, if the individual's fingerprints are compromised (e.g., stolen), they cannot be replaced, and the hackers will have the individual's fingerprints ad infinitum. Thus, the individual faces an increased risk of identity theft with no recourse, resulting in a significant concern to every entity and/or industry using the fingerprint authentication. Further, different biometric technologies require different devices (e.g., fingerprint sensors, retinal sensors, palm vein sensor, facial recognition system, etc.), leading to a wide range of cost. In addition, there are privacy concerns. As such, these concerns have prevented a wider adoption of Type 3 authentication.

In order to address these concerns and limitations pertaining to the authentication factor types, organizations are transitioning to multi-factor authentication, requiring users to provide at least two different authentication factors to prove their identity before gaining access to a resource system. By combining two or three authentication factors, multi-factor authentication renders it more difficult for a hacker to attack successfully. For example, with just a password, an attacker must have a single attack skill and wage a single successful attack to compromise the password. With multi-factor authentication, the attacker must have multiple attack skills and launch multiple successful attacks simultaneously in order to impersonate the user. Typically, a Type 1 authentication factor (e.g., password) is used with either a type 2 authentication factor (e.g., token) or a type 3 authentication factor (e.g., fingerprints). For example, an SMS (short message service) text message to a user's mobile phone with a one-time seven-digit PIN is used with the username and password credentials to gain access to, e.g., a Coinbase® account. In another example, a fingerprint is used with a PIN to gain access to, e.g., Samsung Pay®. However, these conventional multi-factor authentication approaches require the user to sequentially prove knowledge of, e.g., the PIN and validity of, e.g., the fingerprints by entering the PIN on a keyboard (or touch screen) and subsequently scanning one or more fingerprints on the touch screen (or a fingerprint reader). As such, it takes several steps and often requires using more than one device for these sequential multi-factor authentications: enter a password on a device (e.g., a mobile phone), verify the password (e.g., by the owner of the system, e.g., PayPal®), receive an OTP token on a preferred communication channel (e.g., email or SMS message), enter the OTP token on the device(s), and then verify the OTP token. In this fast-paced society, it would be helpful to reduce required steps, time, and devices for user authentication.

There is a room for improvement in user authentication technologies, particularly multi-factor authentication technologies.

SUMMARY OF THE INVENTION

Accordingly, it is an object of the present disclosure to provide a novel method and system for multifactor authentication, specifically for authentication via one integrated authentication factor (FingerPIN) combining fingerprints and personal identification numbers (PIN). Under the embodiments in accordance with the present disclosure, a user must simultaneously prove knowledge of the PIN and validity of the user's biometrics features by scanning one fingerprint or a plurality of fingerprints in a sequence determined by the PIN based on a confidential mapping between digits and fingerprints. While such confidential mapping may be difficult to remember and may slow down user authentication, what a user really needs to recall is the sequence of fingerprints corresponding to the digits of the PIN, as both the PIN and the confidential mapping are set once in the registration/enrollment phase and may change infrequently. Additionally, in an embodiment of this disclosure, (1) the confidential mapping is generated randomly by the system, (2) during registration the user provides a sequence of fingerprints (FingerPIN), (3) the system infers the PIN based on the confidential mapping and the FingerPIN, (4) both the mapping and the PIN are kept secret and not disclosed to the user. If either the PIN or the confidential mapping need to be changed either reactively, in response to a compromise, or proactively, e.g., when implementing the principle of Moving Target Defense (MTD), this can be done without altering the FingerPIN chosen by the user by (1) generating a new random mapping, and (3) inferring the new PIN based on the confidential mapping and the original FingerPIN. If the sequence of fingerprints needs to be changed, either reactively or proactively, but there is no reason to believe that the mapping also needs to be changed, (1) the user will be prompted to choose a new sequence of fingerprints (FingerPIN), (2) a new PIN will be inferred based on the existing mapping and the new FingerPIN. Finally, if both the mapping and the FingerPIN need to be changed, all the steps of the registration will be repeated. Therefore, the confidential mapping may be updated automatically and randomly in a way that is transparent for the user, but not predictable to malicious actors. Such a mechanism would be inspired to the principle of Moving Target Defense (MTD), which aims at increasing the complexity for the attacker by periodically and proactively reconfiguring one or more parameters of the target system. In another embodiment, when the user desires to retain full control on the mapping, the mapping can be provided as an input by the administrator or user. In another embodiment, for authentication the user receives a challenge (e.g., what is third finger digit of your FingerPIN?) and in response, the user is required to present the requested finger digit based on a sequence of fingerprints selected by the user during registration.

The novel FingerPIN authentication method and system may be widely adopted in various government and commercial applications. In particular, it could be adopted in every application that needs to store and secure critical information such as computer network login, important client information, employee records, payroll data, etc. Undoubtedly, this novel FingerPIN authentication method and system in accordance with the present disclosure may be implemented on any devices including a fingerprint authentication system such as a mobile phone, thereby giving its users access to credit cards, banking information, etc. The FingerPIN authentication method and system may be useful in healthcare to secure medical records as well as for medical records management.

In addition, the FingerPIN authentication method and system is a substantial advance in authentication technology. Unlike traditional multi-factor authentications, where multiple factors are presented sequentially by the user, the FingerPIN authentication method and system in accordance with the present disclosure integrates a plurality of authentication factors into a composite factor, and the users need to simultaneously prove not only knowledge of such factors but also knowledge of the integration logic (how the plurality of authentication factors are combined).

Moreover, the FingerPIN authentication method and system in accordance with the present disclosure may significantly mitigate current concerns (e.g., the concerns regarding compromised biometric features) since FingerPIN authentication is robust even if one or more fingerprints have been compromised (as described in reference to FIGS. 5A-6B) and makes brute-force attacks extremely costly.

These objectives are achieved according to embodiments of the present disclosure by providing a method of authenticating a user using a multi-factor authentication system for access to a resource system. The method includes initializing the multi-factor authentication system based on an input comprising a user request for access to the resource system; presenting a challenge requesting the user to enter a specific authenticator of a sequence of authenticators stored in the multi-factor authentication system, where the stored sequence of authenticators represents a combination of a plurality of authentication factors; receiving an authenticator from the user in response to the challenge; verifying identity of the user by determining whether the received authenticator matches the specific authenticator requested by the challenge; and granting the access based on a determination that the received authenticator matches the specific authenticator requested, or denying the access based on a determination that the received authenticator does not match the specific authenticator requested.

In some examples, the sequence of authenticators is a FingerPIN and the combination of the plurality of authentication factors includes combination of enrolled fingerprint templates and registered personal identification (PIN) of the user. In some examples, the combination of the enrolled fingerprint templates and registered PIN includes assignment, by the user, of respective digits to the enrolled fingerprint templates based on a confidential mapping generated by the user during enrollment, selection, by the user, of a PIN comprising a set of the respective digits arranged in a sequence chosen by the user during registration, and generation, by the user, of the FingerPIN based on the confidential mapping and the PIN, where the FingerPIN includes a set of the enrolled fingerprint templates having the same digits as the set of the respective digits arranged in the chosen sequence of the PIN. In some examples, at least one of the confidential mapping or the PIN is changed by the user upon a lapse of a predefined period, in response to a compromise of at least the confidential mapping or the PIN, or at any time. In some examples, the received authenticator is a fingerprint of the user captured by a sensor, and verifying the identity of the user requires a simultaneous proof of validity of the captured fingerprint of the user and user knowledge of the sequence of authenticators. In some examples, the combination of the enrolled fingerprint templates and the PIN includes generation, by the multi-factor authentication system, of a confidential mapping in which the enrolled fingerprint templates are assigned respective digits randomly; receipt of the FingerPIN from the user during registration, the FingerPIN comprising a sequence of fingerprints having corresponsive respective digits based on the confidential mapping; and generation, by the multi-factor authentication system, of the PIN comprising a set of digits arranged in the order of the corresponsive respective digits based on the FingerPIN and the confidential mapping. In some examples, the confidential mapping and the PIN remain confidential and not disclosed to the user. In some examples, the confidential mapping is changed by the multi-factor authentication system proactively or in response to a compromise of at least one of the confidential mapping or the PIN, and the PIN is changed based on the changed confidential mapping and the FingerPIN. In some examples, the FingerPIN is changed by the user upon receiving a prompt to generate a new FingerPIN based on a determination that a change to the FingerPIN is needed. In some examples, based on a determination that both the confidential mapping and the FingerPIN are needed to be changed, the combination of the enrolled fingerprint templates and PIN includes a new confidential mapping generated by the multi-factor authentication system, the new confidential mapping comprising new respective digits randomly assigned to the enrolled fingerprint templates, a new FingerPIN received from the user, and a new PIN generated based on the new confidential mapping and the new FingerPIN, the new PIN comprising a set of new digits arranged in the order of new corresponsive respective digits of the FingerPIN.

Another embodiment provides a method of creating a multi-factor authenticator using a multi-factor authentication system. The method includes collecting user data including a plurality of biometric authenticators from a user; creating biometric authenticator templates of the user based on the collected biometric authenticators; generating a confidential mapping based on the biometric authenticator templates; receiving from the user the multi-factor authenticator; and generating a non-biometric authenticator based on the confidential mapping and the sequence of the multi-factor authenticators.

In some examples, generating the confidential mapping includes assigning randomly respective digits to the biometric authenticator templates. In some examples, the confidential mapping and the non-biometric authenticator remain confidential and are not disclosed to the user. In some examples, the biometric authenticator templates include collected fingerprints of the user, the confidential mapping comprises collected fingerprints randomly assigned to respective digits; and the received multi-factor authenticator is a FingerPIN comprising a sequence of fingerprints having corresponsive respective digits based on the confidential mapping. In some examples, the confidential mapping is changed by the multi-factor authentication system proactively or in response to a compromise of at least one of the confidential mapping or the PIN, and the PIN is changed based on the changed confidential mapping and the FingerPIN. In some examples, the FingerPIN is changed by the user upon receiving a prompt to generate a new FingerPIN based on a determination that a change to the FingerPIN is needed. In some examples, based on a determination that both the confidential mapping and the FingerPIN are needed to be changed and the method further includes: generating a new confidential mapping comprising new respective digits randomly assigned to the enrolled fingerprint templates; receiving a new FingerPIN received from the user; and generating a new PIN based on the new confidential mapping and the new FingerPIN, the new PIN comprising a set of new digits arranged in the order of new corresponsive respective digits of the FingerPIN.

Yet another embodiment provides a multi-factor authentication system for authenticating a user for access to a resource system. The multi-factor authentication system includes an input apparatus configured to receive an input including an authenticator, the input apparatus including a biometric sensor, an output apparatus configured to output at least a challenge requesting the user to enter a specific authenticator in a sequence of authenticators stored in an enrollment module or a trusted memory of the multi-factor authentication system; a control system coupled to the input apparatus and the output apparatus, the control system including the enrollment module configured to enroll and store a biometric authenticator templates of the user, a registration module configured to register at least a non-biometric authentication factor, and an authentication module configured to: verify identity of the user based at least in part on the authenticator received in response to the challenge is the same as the requested specific authenticator of the stored sequence of the authenticators, and grant the access to the user based on a successful verification of the identity of the user, or deny the access to the user based on a failure to verify the identity of the user; and a communication module coupled to the resource system and configured to at least transmit or receive data from the resource system via wired or wireless communications technologies upon granting of the access.

In some examples, the biometric authenticator templates are enrolled fingerprint templates of the user, the non-biometric authentication factor is a personal identification number (PIN), the sequence of the authenticators is a FingerPIN and the enrollment module is further configured to enroll a confidential mapping in which the user has assigned respective digits to the enrolled fingerprint templates, the PIN comprising a set of the respective digits in a sequence chosen by the user and the FingerPIN comprising a sequence of fingerprints including corresponsive digits based on the confidential mapping and the PIN, the corresponsive digits having the same sequence as the chosen sequence. In some examples, the biometric authenticator templates are enrolled fingerprint templates of the user, the non-biometric authentication factor is a personal identification number (PIN), the sequence of the authenticators is a FingerPIN comprising a sequence of fingerprints having respective digits, the FingerPIN having been entered by the user during the enrollment, the enrollment module is further configured to generate a confidential mapping randomly assigning respective digits to the enrolled fingerprint templates, and the registration module is further configured to generate the PIN based on the confidential mapping and the FingerPIN.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

Figure 1:
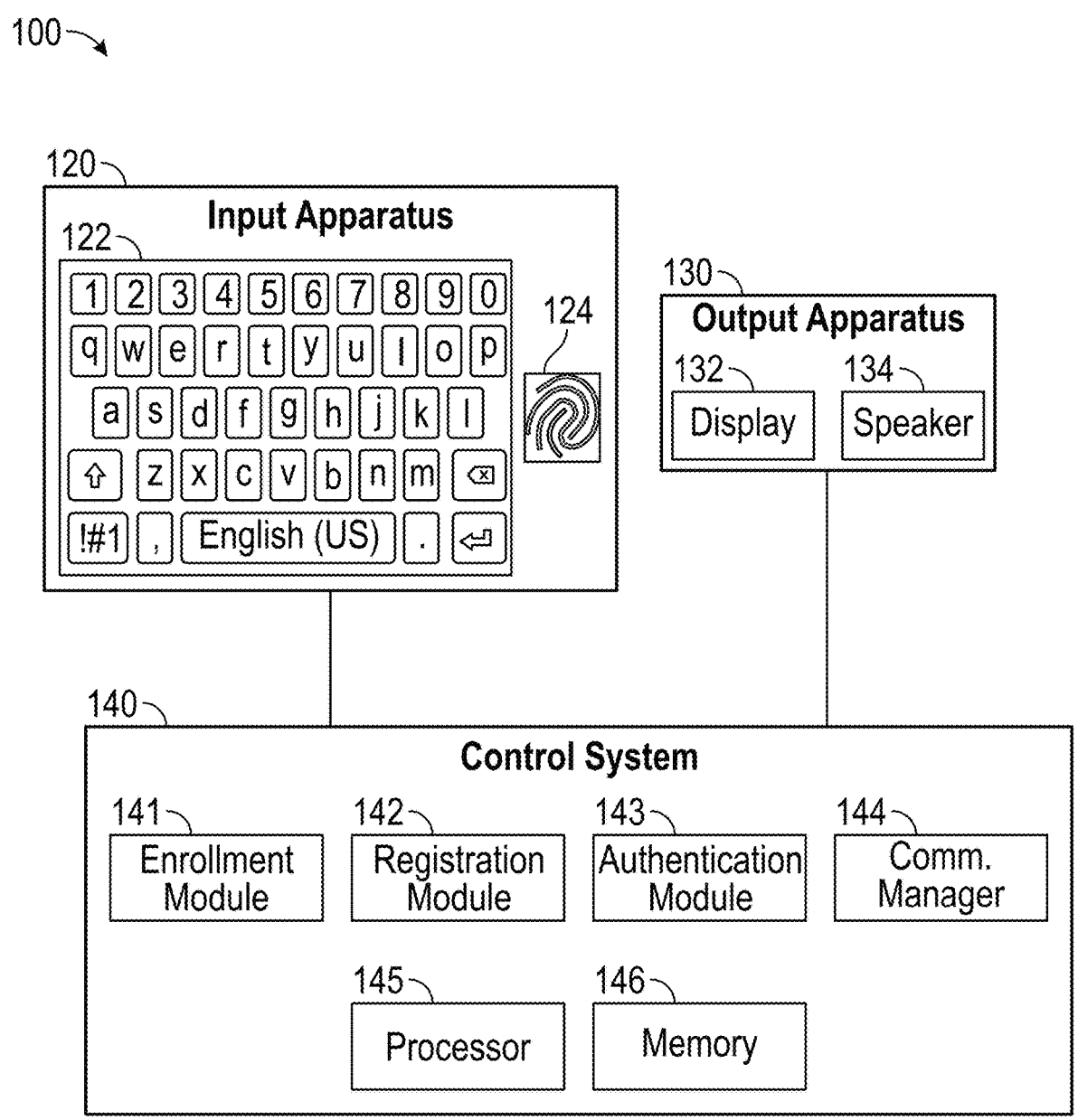
FIG. 1 is an exemplary FingerPIN authentication system according to one particular, non-limiting exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

Figure 3:
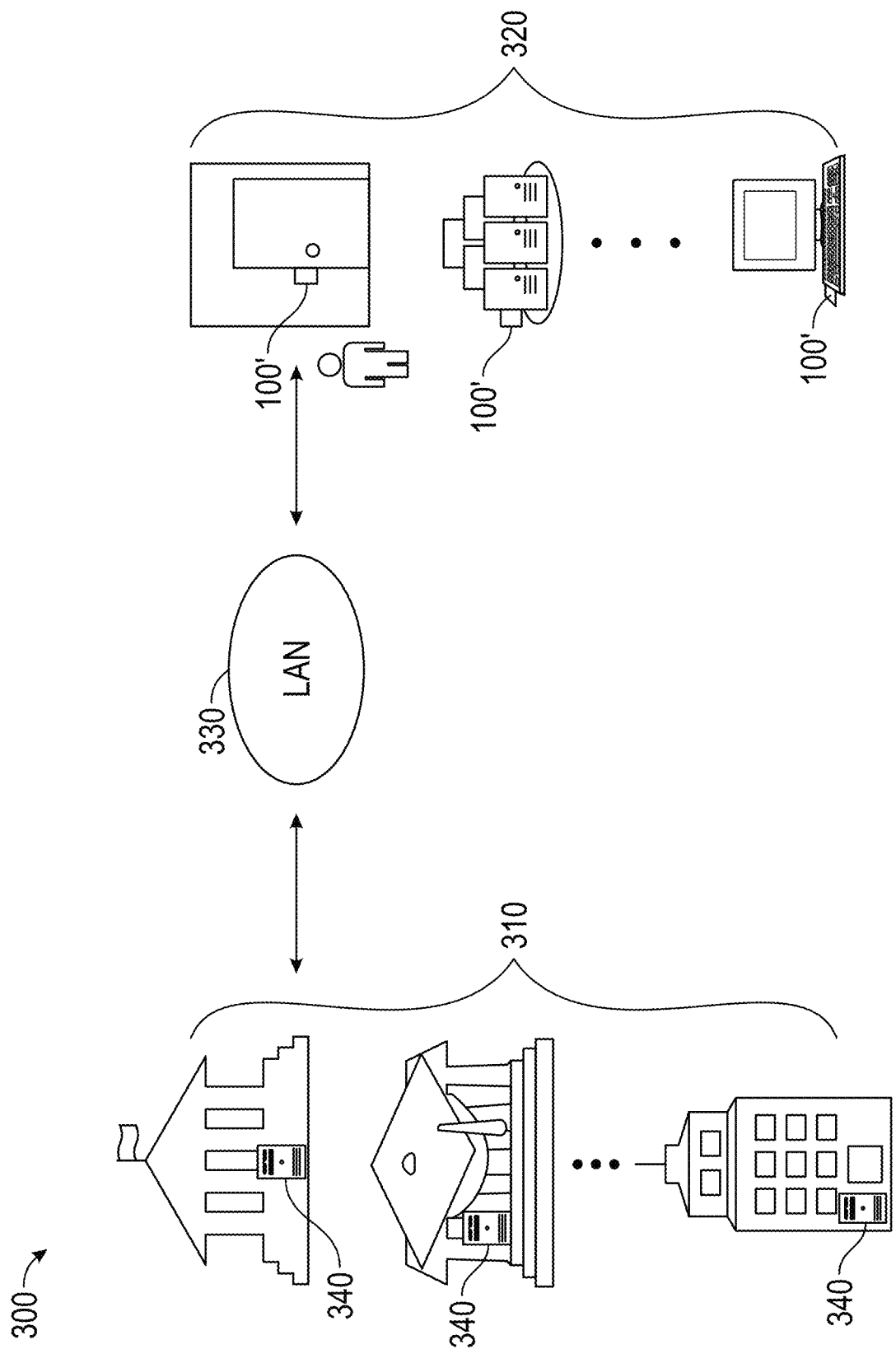
FIG. 3 is an exemplary system for authentication using FingerPIN according to one particular, non-limiting exemplary embodiment of the disclosed concept.
Figure 4:
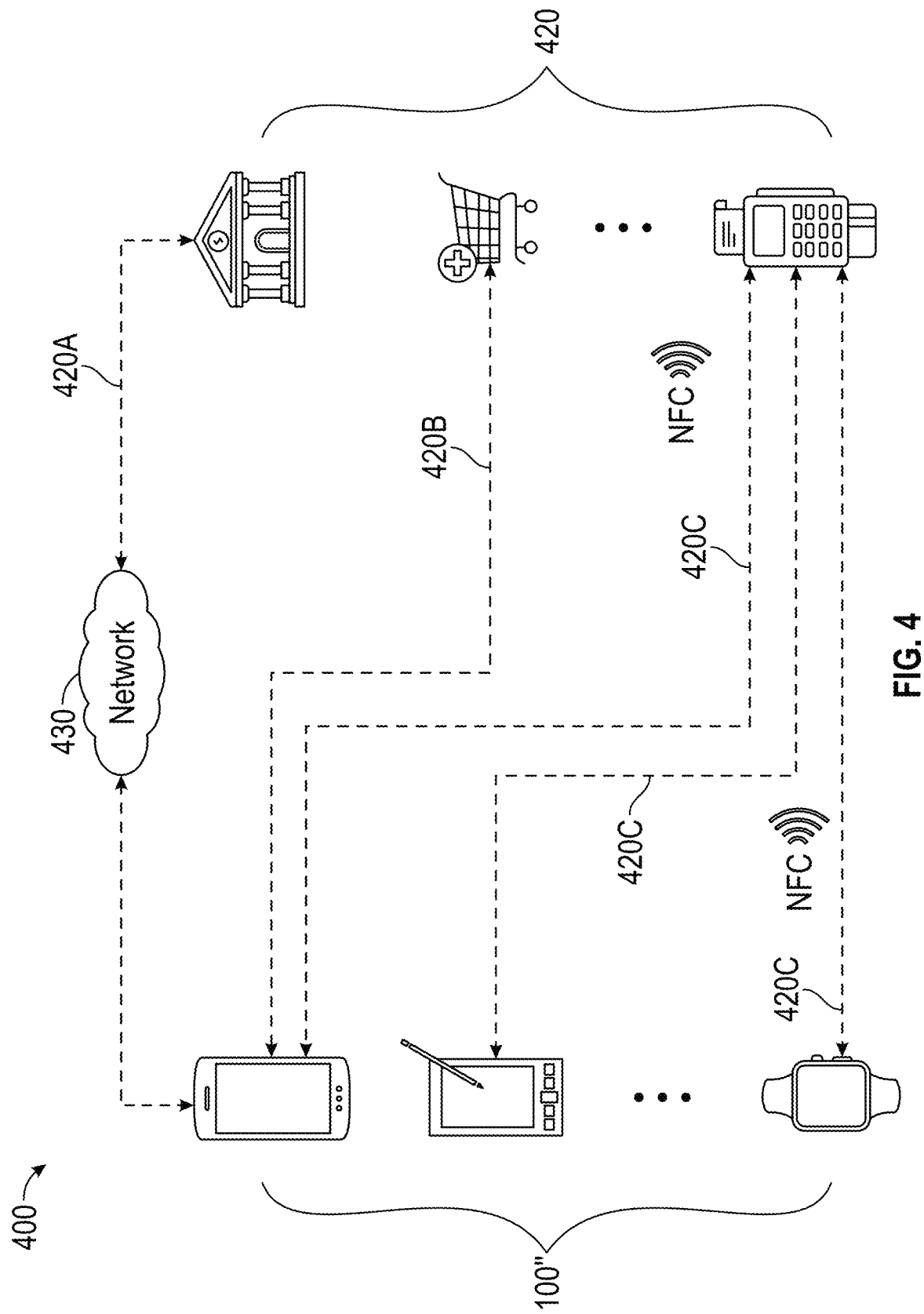
FIG. 4 is an exemplary system for authentication using FingerPIN according to one particular, non-limiting exemplary embodiment of the disclosed concept.

FIG. 1 is a block diagram of an exemplary multi-factor authentication system 100 for authenticating a user for access to a resource system according to one particular, non-limiting exemplary embodiment of the disclosed concept. The exemplary multi-factor authentication system may be a FingerPIN authentication system 100, which may be a PC, a laptop, a biometric reader, a mobile device, a wearable device, or any other devices capable of sensing and processing fingerprints. For example, the FingerPIN authentication system 100 may be a biometric reader attached to a door of a secured building, facility or a room, a biometric reader attached to a data server, an equipment, or a terminal, etc. as shown in FIG. 3. In another example, the FingerPIN authentication system 100 may be a mobile device (e.g., without limitation a cellular phone, a PDA, a wearable device, etc. as shown in FIG. 4) communicatively coupled to the resource system (e.g., a bank, a corporation, a government building) to which the user is attempting to access. The FingerPIN authentication system 100 may include input apparatus 120 (which in the illustrated embodiment includes a keyboard 122 and a fingerprint scanner 124), an output apparatus 130 (which in the illustrated embodiment comprises a display (e.g., an LCD) 132 and a speaker 134), and a control system 140 including an enrollment module 141, registration module 142, authentication module 143, communication manger 144, processor 145, and a memory 146. A user is able to provide input into the control system 140 using the input apparatus 120, and the control system 140 provides output signals to display 132 to enable display 132 to display information to the user, such as, without limitation, results of authentication (success or fail) or a challenge question generated using the method of the present invention. In some cases, the control system 140 provides output signals to speaker 134 to enable speaker 134 to emit audible information (e.g., without limitation authentication success or fail, a challenge question, etc.) to the user.

The processor 145 may be, for example and without limitation, a microprocessor (μP), a microcontroller, or some other suitable processing device, that interfaces with the memory. The memory 146 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory 146 has stored therein a number of routines that are executable by the processor 145. In some examples, the memory 146 may include a trusted memory in which the user's enrolled fingerprint templates, registered authentication factors (e.g., username, passwords, PINs, FingerPIN, etc.) or any updates thereof may be stored. This user-centric storage reduces privacy concerns or theft concerns of the user. One or more of the routines implement (by way of computer/processor executable instructions) at least one embodiment of the method discussed in detail herein.

The enrollment module 141, the registration module 142, and the authentication module 143 may be software including codes or algorithms to implement aspects of the present disclosure. The software may include instructions for the processor 145 to perform at least: collect user data including a plurality of biometric authenticators from the user, create biometric authenticator templates (e.g., fingerprint templates) of the user based on the collected fingerprints, enroll a confidential mapping generated by the user during enrollment or generate a confidential mapping randomly assigning the fingerprint templates to respective digits, receive a sequence of fingerprints having corresponsive digits (FingerPIN), update or change the confidential mapping, the FingerPIN or the PIN by the user in response to a compromise detected or suspected by the FingerPIN authentication system 100 or proactively, or enroll a new confidential mapping, a new PIN or a new FingerPIN generated by the user, etc. The software may be stored in a non-transitory computer-readable medium such as the memory 146 or other memory.

The enrollment module 141 is configured to enroll the fingerprint templates and store the enrolled fingerprint templates and the confidential mapping via which the fingerprint templates are assigned respective digits. In some cases, the enrolled fingerprint templates may be stored in a trusted memory of the memory 146, or an authorized user database (not shown) located at command center of the resource system. The user may use the enrollment module 141 to enroll their fingerprints from any location at any time or visit the command center (e.g., an enrollment center) of the resource system to present their fingerprints for enrollment. For enrollment, the user's fingerprints are acquired by the fingerprint sensor 124. The fingerprint sensor 124 can be, for example, an optical sensor, a capacitance sensor, or an ultrasonic sensor. An optical sensor applies bright light over a user's fingerprint and acquires the image of the fingerprint using a light-sensitive microchip (e.g., a charge-coupled device or a CMOS image sensor) to produce a digital representation of the fingerprint. A capacitive sensor uses ridges and valleys or the distances between the ridges of the user's finger to create digital representation of the user's fingerprint. The capacitive sensor may be incorporated into a touchscreen on, e.g., mobile phones, fingerprint reader, etc. The touchscreens may be a part of the input apparatus 120, fingerprint sensor 124, or the display 132. An ultrasonic sensor uses high-frequency sound waves (ultrasound) in the capacitive scanners, to capture the user's fingerprints, and then creates a digital representation of the fingerprints. The digital representation is processed by a feature extractor (not shown), and a more compact representation, called a template, is obtained. Multiple templates of the user's fingerprints may be enrolled or stored in order to account for variations observed in the fingerprints.

In some embodiments, the user also defines the confidential mapping between digits (e.g., 0 to 9) and fingers (e.g., multiple fingers) during the enrollment. The user scans, enters, or photographs their fingers (e.g., up to all ten fingers) and maps each finger to a digit (e.g., 0 to 9). A single fingerprint mapped to a digit in a chosen sequence under the confidential mapping may be referred to as a finger-digit. For example, the user may map their left little finger to "9", left ring finger to "3", left middle finger to "0", left index finger to "7", left thumb to "6", right thumb to "1", right index finger to "8", right middle finger to "4", right ring finger to "5" and right little finger to "2" in accordance with the user's preference. Thus, each enrolled fingerprint is assigned respective digit by the user in accordance with the confidential mapping. As such, the initial confidential mapping is not predefined by the FingerPIN authentication system 100 or the resource system, but rather carefully selected by the user at enrollment. In these embodiments, in order to enhance the security feature added by the confidential mapping, it is discouraged to map the fingers in a sequence that may be easily guessed (e.g., mapping left little finger to "0", left ring finger to "1", . . . right little finger to "9"). While in this example, all ten fingers are mapped to digits, this is for illustrative purposes only and less fingers may be mapped based on the user preference and selection without departing from the scope of the present disclosure. In these embodiments, the confidential mapping is only known to the user and/or authorized personnel of the resource system. The confidential mapping may be stored in the enrollment module 141, a trusted part of the memory 146 or an authorized user database of the resource system. Thus, the confidential mapping of the finger-digits provides a first layer of security for the FingerPIN authentication system 100 since an attacker must crack the confidential mapping, among others, in order to steal the FingerPIN.

In some embodiments, the enrollment module 141 is structured to generate a confidential mapping randomly by the FingerPIN authentication system 100. If the confidential mapping needs to be changed in response to a compromise of the confidential mapping or proactively for, e.g., implementing a MTD principle, the enrollment module 14 generates a new confidential mapping randomly assigning new respective digits to the fingerprint templates. As discussed with respect to the registration module, the PIN is inferred based on the existing or new confidential mapping and the existing or new FingerPIN. The confidential mapping and the PIN remain confidential and are not disclosed to the user. Therefore, the confidential mapping may be updated automatically and randomly in a way that is transparent for the user, but not predictable to bad actors. Such updates or changes of the confidential mapping and/or the PIN would be inspired to the principles of Moving Target Defense (MTD), which aims at increasing the complexity for the attacker by periodically and proactively reconfiguring one or more parameters of the target system. The MTD has been developed to address the vulnerabilities of the current IT systems against countless malicious attacks, the vulnerabilities resulting in part from the current IT systems having been built to operate in a static environment including, e.g., without limitation, addresses, names, software stacks, networks and various configuration parameters remaining the same over a long period. While such static system worked well when malicious attacks were not a concern, the current ecosystem exposed to ever-evolving and persistent malicious attacks by bad actors leaves the IT systems susceptible to the infiltration or compromise by the bad actors. The MTD is the concept of controlling change across multiple system dimensions in order to increase uncertainty and complexity for bad actors, and reduce windows of opportunity. The MTD assumes that perfect security is not obtainable and thus all systems are compromised. As such, research in the MTD focuses on enabling the system to continue to operate safely in the compromised environment. As such, the automatic change and/or update of the confidential finger mapping is consistent to the MTD's principle of increasing the uncertainty and complexity for the bad actors by adding a dynamic security feature, i.e., automatic change of the confidential mapping.

The registration module 142 is configured to register a PIN. In some embodiments, the user selects the PIN at registration and the FingerPIN. The PIN includes a set of the respective digits (assigned to enrolled fingerprint templates) arranged in a sequence chosen by the user during registration. The PIN determines the sequence of fingerprints to be presented for authentication. For example, the user may select "25341" as the PIN. Each digit of "25341" is included in the respective digits assigned to the enrolled fingerprint templates based on the confidential mapping. As such, the digits selected for the PIN are a set (e.g., a subset, etc.) of the respective digits of the enrolled fingerprint templates. Based on the PIN selected, a sequence of a set of the enrolled fingerprint templates is determined: the first digit of the PIN is "2", which is mapped to the right little finger, and the following four digits of the PIN are mapped to the right ring finger, left ring finger, right middle finger, and right thumb. Thus, the sequence of the set of the enrolled fingerprint templates as determined by the PIN "25341" is right little finger, right ring finger, left ring finger, right middle finger, and right thumb.

In these embodiments, the registration module 142 FingerPIN is the stored sequence of the set of the enrolled fingerprint templates arranged in the chosen sequence of the PIN and the enrolled fingerprint templates (fingerprint components or finger-digits) in the stored sequence. As such, the FingerPIN represents a combination of enrolled fingerprint templates, which have been assigned respective digits based on the confidential mapping and the registered PIN. The combination of the enrolled fingerprint templates and the registered PIN includes assignment of respective digits to the enrolled fingerprint templates based on a confidential mapping generated by the user during enrollment, selection of the PIN including a set of the respective digits arranged in a sequence chosen by the user during registration, and generation of the sequence of the set of the enrolled fingerprint templates based on the confidential mapping and the PIN, where the set of enrolled fingerprint templates includes same digits as the set of the respective digits arranged in the chosen sequence of the PIN. The sequence of the set of the enrolled fingerprint templates is stored in an enrollment module 141 or a trusted memory (a part of the memory 146). Alternatively, the sequence of the set of the enrolled fingerprint templates may be stored in an authorized user database of the resource system.

In some embodiments, the registration module 142 generates a PIN based on a confidential mapping randomly generated by the FingerPIN authentication system 100 and the FingerPIN. The PIN is inferred from the FingerPIN and the confidential mapping. If the FingerPIN needs to be changed, but not the confidential mapping, the communication module 144 transmits a message to the user via, e.g., emails, text messages, etc. prompting the user that the FingerPIN needs to be changed, and receives a new FingerPIN created by the user. Upon receipt of the new FingerPIN, the PIN is inferred from the existing confidential mapping and the new FingerPIN. If the confidential mapping needs to be changed, but not the FingerPIN, the PIN is inferred from a new confidential mapping and the existing FingerPIN. If both the confidential mapping and the FingerPIN need be changed, then the PIN is inferred from the new confidential mapping and the new FingerPIN. The registration module 142 registers both the PIN and the FingerPIN. In these embodiments, the FingerPIN is selected sequence of fingerprints having corresponsive digits. The confidential mapping randomly assigns respective digits to the enrolled fingerprint templates of the user. The PIN includes a set of the respective digits that are the same as the corresponsive digits. As such, FingerPIN in these embodiments also represents a combination of a set of the enrolled fingerprint templates and the PIN.

To sum, the FingerPIN integrates two authentication factors: the PIN (type-1 authentication factor) and the enrolled fingerprints (type-3 authentication factor), and unlike the conventional multi-factor authentication systems in which each authentication factor is entered and/or verified sequentially, the FingerPIN authentication requires entry of one authentication factor (e.g., a third finger-digit of the FingerPIN) in response to a challenge (e.g., what is the third digit of your PIN?). As such, for authentication the FingerPIN requires the user to prove simultaneously: validity of a captured fingerprint and knowledge of the stored sequence (FingerPIN) (i.e., how the two authentication factors, the PIN and the enrolled fingerprints, are combined). That is, in addition to the first security layer created by the confidential mapping, the FingerPIN offers a second security layer by requiring the user to prove their knowledge of the FingerPIN by entering a specific digit of the FingerPIN in response to a challenge, a third security layer by requiring the user to validate their fingerprint representing the requested digit, and a fourth security layer by requiring such proof and validation to occur simultaneously. Further, in some embodiments the FingerPIN authentication system provides a fifth security layer by automatically changing or updating the confidential mapping and/or the PIN in a way that is predictable for the user, but not for the bad actors.

The authentication module 143 is structured to authenticate the fingerprints acquired or captured from the user via the fingerprint scanner 124. FingerPIN authentication is performed using a challenge authentication mode in which the user is presented with a challenge requesting the user to provide a specific finger-digit of the FingerPIN (e.g., the third finger-digit). If the FingerPIN is "25341" PIN, since the third digit is "3" and fingerprint corresponsive to "3" is the user's left ring finger, the user is required to provide only the user's left ring finger for authentication, rather than all fingers representing the user's FingerPIN. By entering the correct fingerprint, the user simultaneously proves for authentication: validity of the captured fingerprint and knowledge of the FingerPIN. However, while the entry of the correct specific finger-digit proves the user's knowledge of the PIN and the confidential mapping, the user need not even remember the PIN or the confidential mapping—the user needs to remember only the sequence of finger-digits (i.e., the FingerPIN) for authentication, which is as simple as remembering a conventional PIN. As such, the FingerPIN authentication approach provides efficiency and convenience to the user in addition to the high level of security.

Communications manager 144 is structured to perform communication functions between the FingerPIN authentication system 100 and, e.g., the authorized user database of the resource system, or one or more resources of the resource system upon granting the access to the user based on a successful verification of the user identity. For example, the communication manager 144 transmits a message to the user prompting that the FingerPIN needs to be changed based on a compromise detected or proactively, e.g., as implementing MTD principles. It may include a transceiver and antennas for transmitting a request for and receiving enrolled fingerprint templates for authentication purposes, transmitting updates or changes to the confidential mapping or the FingerPIN to be stored in the authorized user databases, transmitting and receiving data to and from the resource system upon granting of the access to the user, etc. The communications manager 144 or its components may be implemented in hardware, software executed by the processor 145, firmware, or any combination thereof. If implemented in software executed by the processor 145, the functions of the communications manager 144 may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform various functions, e.g., selecting appropriate communications channel (e.g., a local area network (LAN) such as an Ethernet network or any type of communications channel using cables, radio frequency transmission, optical transmission over fibers, infrared transmission, or any other wired or wireless communication mode capable of providing the communication described herein), or communications protocols and standards (e.g., Wi-Fi, Bluetooth, LTE, LTE-A, etc.), generating messages in the determined communications protocols and standards to communicate with the authorized user database of the resource system (e.g., a database server), or one or more resources of the resource system, and transmitting and receiving messages to and from the resource system, the authorized user databases, etc.

The FingerPIN approach in accordance with the present disclosure provides a higher level of security than the conventional multi-factor authentication methods. By requiring the user to enter one authentication factor integrating multiple different authentication factors, the FingerPIN approach requires the user to authenticate the multiple authentication factors simultaneously, increasing the level of security and efficiency from those of the conventional multifactor authentication methods that require sequential authentication of the authentication factors, one-by-one. Further, by requiring the user to simultaneously prove validity of the captured fingerprint in response to the challenge, and knowledge of the confidential mapping and the FingerPIN (i.e., the stored sequence of the enrolled fingerprint templates), the FingerPIN approach increases the complexity for an attacker significantly more than the conventional multifactor authentication which do not require the knowledge of how the authentication factors are integrated and/or to be presented for authentication. In addition, the FingerPIN approach in accordance with the present disclosure enhances convenience to the user by requiring to remember only the FingerPIN for authentication. Not even the confidential mapping nor the PIN is required to be remembered by the user. Moreover, in some embodiments, the automatic change of the confidential mapping in a way that is transparent to the user and not predictable by the bad actors, provides additional security consistent to the principle of the moving target defense. Furthermore, the FingerPIN approach may be adopted with little minimal adjustments in any commercially available fingerprint authentication systems since the FingerPIN approach utilizes the components, devices, systems, and technologies already embedded in those commercially available fingerprint authentication systems. For example, the mobile devices (e.g., cellular phones, tablets, etc.) already use fingerprints and/or PINS to unlock the devices. Therefore, the FingerPIN approach provides a heightened level of security, increased efficiency, and convenience with little or no additional cost or design changes. Additionally, in an embodiment using other types of biometrics in accordance with the present disclosure, any biometric reader (e.g., iris scanner, retinal sensor, palm vein readers, facial recognition system, etc.) already have the capability of capturing the biometrics and other types of authentication factors for authentication. As such, these biometric readers may easily integrate a plurality of authentication factors in accordance with the present disclosure. In another embodiment using non-biometric authentication factors in accordance with the present disclosure, any devices (e.g., without limitation, a PC, a laptop, a mobile device, etc.) already using non-biometric authentication factors may easily integrate the multi-factor authentication system to authenticate the user.

Figure 2:
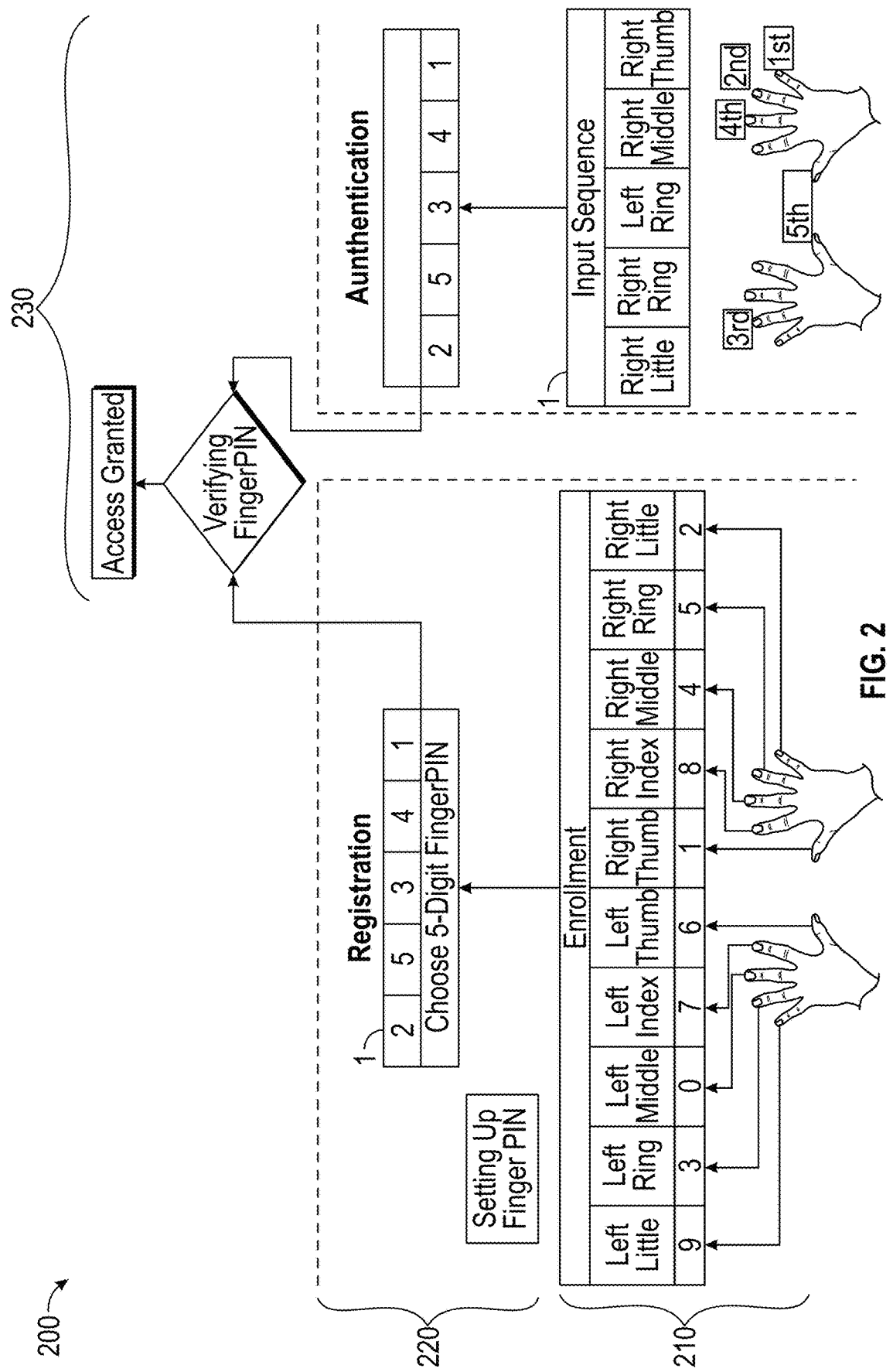
FIG. 2 is a block diagram of a flow of FingerPIN authentication according to one particular, non-limiting exemplary embodiment of the disclosed concept.

FIG. 2 is a diagram 200 showing example steps 210-230 of establishing and executing FingerPIN authentication according to one particular, non-limiting exemplary embodiment of the disclosed concept. The steps include enrollment 210, registration 220, and authentication 230. At 210, the user enrolls their fingerprints using the FingerPIN authentication system 100 as described with reference to FIG. 1, or an enrollment device available at, e.g., a command center or an enrollment center designated by the resource system to which the user is attempting to gain access. During enrollment, a user scans their fingerprints and a sensor (e.g., a fingerprint sensor 124 as described with reference to FIG. 1) acquires the captured fingerprints. The user may enter any number of their fingerprints (e.g., up to all ten fingers.) sufficient to generate a FingerPIN to be selected by the user at registration. In FIG. 2, the user enrolls all ten of their fingerprints, but this is for illustrative purposes only and the number of enrolled fingerprints may vary depending on, e.g., user preference. Upon acquiring the fingerprints by the sensor 124, a digital representation is produced and processed by a feature extractor and a template is obtained. Multiple templates of the user may be stored in order to account for variations observed in the biometric trait (e.g., fingerprints scanned at different angles, etc.). These templates may be enrolled and stored directly in an enrollment module 141 or a trusted memory (e.g., a part or whole of the memory 146 as described with reference to FIG. 1). This user-centric storage may reduce concerns of privacy or identity theft. In some examples, the fingerprint templates may be stored in an authorized user database maintained by the resource system the user is seeking to access. During enrollment, the user also defines a mapping between digits (e.g., 0 to 9) and their fingers. In the example illustrated in FIG. 1, the user maps their left little finger to "9", left ring finger to "3", left middle finger to "0", left index finger to "7", left thumb to "6", right thumb to "1", right index finger to "8", right middle finger to "4", right ring finger to "5" and right little finger to "2" in accordance with the user's preference. It is discouraged to map the fingers in a sequence that may be easily guessed (e.g., mapping left little finger to "0", left ring finger to "1", . . . right little finger to "9"). A single fingerprint mapped to a digit in the chosen sequence in accordance with the confidential mapping and the registered PIN constitutes a finger-digit. In some embodiments, the confidential mapping may be automatically changed by the enrollment module 141 in a way that is predictable to the user, but not to the bad actors. The automatic change may be made at any time or upon a lapse of a predefined period (e.g., 30, 60, 90 days, etc.).

At 220, the user selects a PIN including a set of respective digits arranged in a sequence chosen by the user and registers the PIN with the resource system. The PIN may be stored directly in a trusted memory (e.g., part or whole of the memory 146 of the FingerPIN authentication system 100) and/or remotely in the authorized user database of the resource system. In the illustrated example in FIG. 1, the user selects "25341" as a PIN. This PIN determines the sequence of fingerprints to be presented by the user for authentication. For example, the first digit of the PIN is "2", which is mapped to the right little finger, and thus the user presents the right little finger first. The following four digits are mapped to the right ring finger, left ring finger, right middle finger, and right thumb, respectively, which the user present in that order for authentication. This set of enrolled fingerprints arranged in a chosen sequence of the PIN (i.e., right little finger, right ring finger, left ring finger, right middle finger, and right thumb) is FingerPIN 1. As such, the FingerPIN 1 represents a combination of the PIN and the enrolled fingerprint templates and includes a stored sequence of the set of the enrolled fingerprint templates having same digits as the set of the respective digits arranged in the chosen sequence of the PIN. Thus, the FingerPIN 1 integrates two authentication factors: PIN (type-1 authentication factor) and fingerprints (type-3 authentication factor). The FingerPIN 1 may be changed or updated at any time as the user desires or at a predefined frequency by the FingerPIN authentication system 10 or the resource system.

At 230, the user authenticates their identity based on the FingerPIN 1 and the confidential mapping. FingerPIN authentication may be performed in a challenge authentication mode in which the user is presented with a challenge requesting the user to provide a specific finger-digit of the FingerPIN (e.g., the third finger-digit). In the example of "25341" PIN, since the third digit is "3" and fingerprint corresponsive to "3" is the user's left ring finger, the user is required to provide only the user's left ring finger for authentication, rather than providing all finger-digits corresponsive to the FingerPIN. By entering the correct specific finger-digit, the user simultaneously proves: validity of the captured fingerprint and knowledge of the confidential mapping and the stored sequence of the set of the enrolled fingerprint templates.

FIG. 3 illustrates a resource system 300 using the FingerPIN authentication system 100 according to one particular, non-limiting exemplary embodiment of the disclosed concept. The resource system 300 may be, e.g., without limitation a government entity, university, corporate buildings, etc., and include a main building 310 and a plurality of access units 320 located within or dispersed around the main building 310. The main building 310 may include a command center, an enrollment and registration office (not shown) in which the users first come to enroll and register their identification data. The identification data may include the authorized users' biometrics, usernames, passwords, PINs, etc. for use in authenticating their identities. The identification data may be obtained by, e.g., the user physically providing their biometrics and entering credentials for enrollment and registration. As such, the main building 310 may be equipped with enrollment and registration devices such as a biometric reader (e.g., including fingerprint sensor, iris sensor, retinal sensor, facial recognition system, a camera, etc.) to collect the identification data and other computing device for entering users' credentials (e.g., password, PIN, username, etc.). The main building 310 may also include an authorized user database 340 storing, e.g., without limitation, enrolled biometrics, passwords, usernames, PINs, a list of authorized users, etc.).

The plurality of access units 320 include the secured areas (e.g., medical labs, weapons storage, etc.), databases (e.g., classified data storages, confidential health information server, etc.), terminals (e.g., a PC, a laptop having access to sealed records, etc.) of the resource system 300, to which only authorized users may gain access. As such, each access unit 320 includes a FingerPIN authentication system 100' similar to the FingerPIN authentication system 100 as described with reference to FIG. 1 for authentication of a user. In the illustrated examples of FIG. 3, the FingerPIN authentication system 100' is a biometric reader 100' attached to a door of the secured area, coupled to the database, or integrated in the terminals as shown in the illustrated examples of FIG. 3. For authentication, the FingerPIN authentication system 100' may use the standard authentication mode or the challenged authentication mode as described with reference to FIGS. 1 and 2. In either mode, for authentication the FingerPIN requires the user to simultaneously prove: validity of the captured fingerprint(s) and knowledge of the sequence of the FingerPIN as described with reference to FIGS. 1 and 2. Upon such simultaneous proof, the user's identity is verified and authenticated and the user is granted access to the access unit 320.

The LAN 330 communicatively couples the plurality of access units 320 and the main building 310 of the resource system 300. The LAN 330 may be an Ethernet network communicating over a coaxial cable, shielded twisted pair cable, or unshielded twisted pair cable, or any other communication network using radio frequency, fiber-optic cables, infrared transmission or any other wired or wireless communication technologies. The LAN 330 also communicatively couples the FingerPIN authentication system 100' and the authorized user database 340.

The authorized user database 340 may be located at the main building 310 or at another location of the resource system 300, and communicatively coupled to the access units 320 via the LAN 330. The authorized user database 340 may be, e.g., without limitation a server such as storage server, data server, etc. and is structured to, e.g., store the identification data and the list of the authorized users. The server may include a processor (e.g., microcontroller, microprocessor, etc.) and a memory (e.g., RAM, ROM, EEPROM, etc.) for, e.g., without limitation receiving and transmitting any message from and to the FingerPIN authentication system 100'. The identification data include enrolled templates of the authorized users' fingerprints and registered credentials such as usernames, passwords, PINs, etc. The resource system 300 using the FingerPIN authentication system 100' as shown in FIG. 3 is for illustrative purposes and there may be other types of resource systems using different architectures based on, e.g., needs or preference of the resource systems 300.

FIG. 4 illustrates an authentication architecture 400 for making financial transactions 420 using a mobile device 100" including a FingerPIN authentication system 100 as described with reference to FIG. 1 according to one particular, non-limiting exemplary embodiment of the disclosed concept. The modern mobile devices 100" (e.g., cellular phones, PDAs, wearable devices, etc.) already have biometric authentication systems built in. For example, smartphones (e.g., iPhone 5S) uses fingerprint authentication systems to unlock them. Further, smartphones and wearables have a downloadable or built-in payment POS payment applications (e.g., Apply Pay™, Google Pay™, etc.), banking applications, shopping applications, etc., which can be accessed by fingerprint authentication. As such, these mobile devices 100" that are already commercially available can be used easily with the FingerPIN authentication system 100 as described with reference to FIG. 1 with a minimal modification to the devices 100" (e.g., adding source codes including FingerPIN authentication algorithms). The authentication architecture 400 illustrates, e.g., financial transactions 420 (e.g., point of sale transactions 420C, on-line banking 420A, on-line shopping 420B, etc.,) using the mobile devices 100" with the FingerPIN authentication system 100 integrated therein. In order to complete the financial transactions, a banking application, online shopping application or POS payment application (e.g., Apple Pay™, Google Pay™, etc.) may be operable on the mobile device 100". Such applications may be in communication with a bank or online retailer via Internet using wireless communications standards (e.g., without limitation LTE, LTE-A, etc.), or with a POS terminal via, e.g., Near Field Communication (NFC). The following description is made in the context of the online banking transactions 420A, online shopping transactions 420B, or point of sale transactions 420C, but one of ordinary skill in the art will readily recognize the applicability or non-applicability and necessary substitutions for various disclosed features to implement the contemplated mobile device-based authentication in other contexts.

In the illustrated banking transaction 420A, online shopping transaction 420B, or point of sale (POS) transactions 420C, the mobile device 100" with the FingerPIN authentication (not shown) integrated therein is unlocked by using a challenge authentication mode of the FingerPIN authentication system as described with reference to FIGS. 1 and 2. That is, the user is authenticated by inputting a fingerprint in response to a challenge (e.g., what is a third finger-digit of the FingerPIN?) and is verified upon proving simultaneously validity of the captured fingerprint(s) and the stored sequence of the set of the enrolled fingerprint templates (i.e., FingerPIN). Upon such simultaneous proof, the user is authenticated and the mobile device 100" is unlocked for use to perform online banking transactions 420A, online shopping transactions 420B, or POS transactions 430C. For privacy concerns, the mobile device 100" may store the identification data (the enrolled biometrics, the registered credentials, etc.) of the user directly within an enrollment module, the trusted memory of the mobile device 100" or, e.g., a trusted part of the device's hardware (e.g., trusted execution environment (TEE) in Android phone devices). Upon unlocking the mobile device 100", the user may use the banking application or online shopping application for desired transactions via Internet. For point of sale (POS) transactions, the mobile devices 100" may be placed near or in proximity (e.g., 4 cm, 10 cm, etc.) to the POS terminal to complete transactions. The POS transaction application (e.g., Apple Pay™, Google Pay™, etc.) in communication with the POS device then transmits payment information (e.g., credit card number, expiration date, billing ZIP code, or other verification information) via NFC. The POS terminal may then complete the payment process with the received information. While the illustrated example in FIG. 4 shows POS transactions using NFC, other contactless payment technologies (e.g., radio frequency identification, magnetic secure transmission, magnetic emulators, magnetic encoders, etc.) may be used. In some examples, the online banking applications, online shopping applications, or the POS transaction applications may also use the FingerPIN authentication method to sign on to these applications. In these examples, since the mobile device 100" already have the FingerPIN authentication capability, this additional authentication to sign on to the applications via the FingerPIN approach will not require additional costs or devices.

FIGS. 5A-6B illustrates experimental results of FingerPIN vulnerability simulations according to one particular, non-limiting exemplary embodiment of the disclosed concept. Using an example in which the user has mapped all their ten fingers at enrollment and registered a 5-digit PIN, the FingerPIN vulnerability is analyzed by simulating a brute-force attack against FingerPIN authentication by estimating the probability of success in three scenarios: none of the ten fingerprints of the user is compromised by the attacker (Scenario 1), one fingerprint is comprised by the attacker (Scenario 2), and all of the ten fingerprints templates are compromised to the attacker (Scenario 3). Additionally, each scenario is exampled when the confidential mapping is also compromised. The analysis was made on a subset of the ManTech Innovations Fingerprint Study Phase I collection, which contains fingerprints of 500 subjects acquired using seven optical sensors. Images of the ten fingers were acquired using I3 digID Mini sensor. Every subject provided two sets of enrolled fingerprints for both hands. For a PIN-based scheme, the Attack Success Rate can be computed as the percentage of correctly verified PIN numbers entered by the attacker during the user authentication process. It includes the complete PIN sequence verification accuracy and the PIN digit verification accuracy. However, since the present disclosure requires only a specific finger digit to be provided by the user for authentication, and the probability of choosing a given finger digit five times in the sequence is always zero. Biometric matching performance is assessed using: (i) False Match Rate (FMR), the proportion of instances where an impostor is incorrectly labelled as a genuine match with respect to the total number of impostor comparisons; (ii) False Non-Match Rate (FNMR), the proportion of instances where a genuine match is incorrectly labelled as an impostor with respect to the total number of genuine comparisons; and (iii) Detection Error Trade-off (DET) curve, which plots FMR and FNMR as a function of the decision threshold. The inputs to the matcher are two fingerprint samples (e.g., gallery and probe images) and the output is a match score that indicates the proximity of the two samples. A threshold is applied to the match score to determine if the samples correspond to the same identity.

Figure 5A:
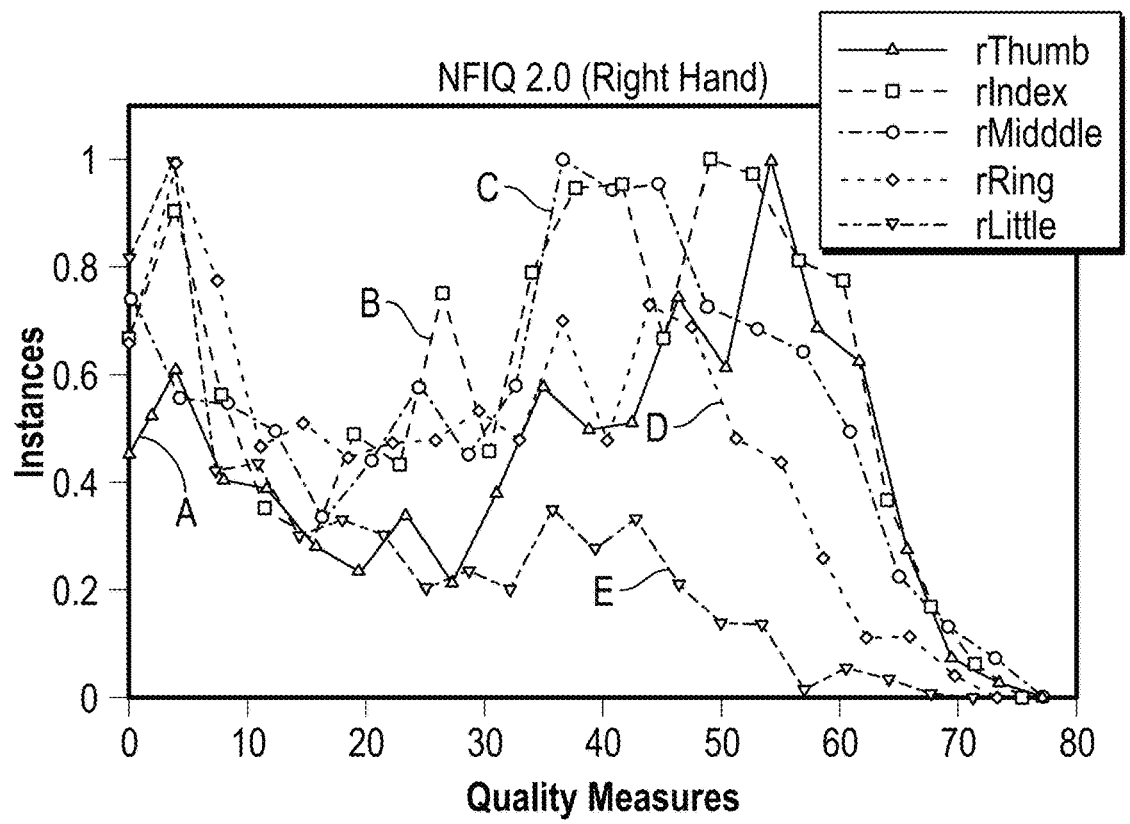
FIGS. 5A-B illustrates distribution graphs of fingers according to one particular, non-limiting exemplary embodiment of the disclosed concept.
Figure 5B:
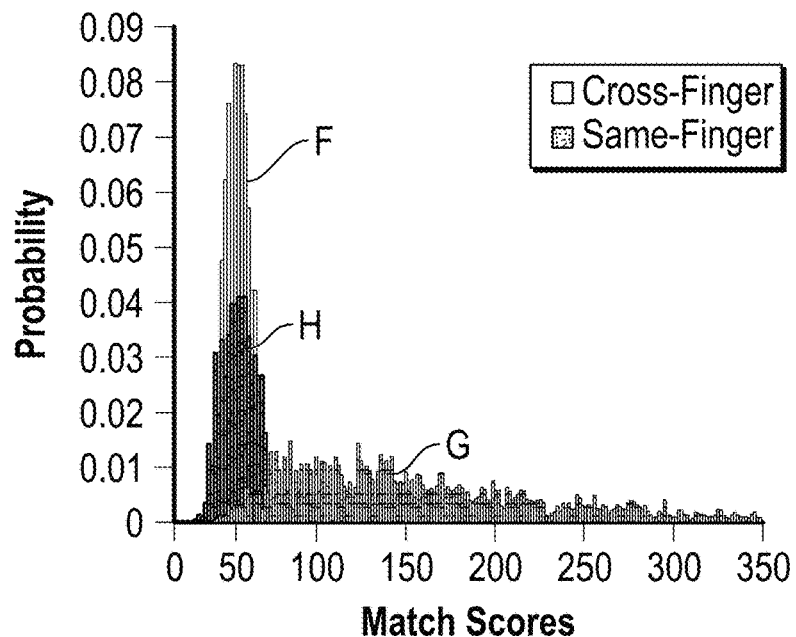
Figure 6A:
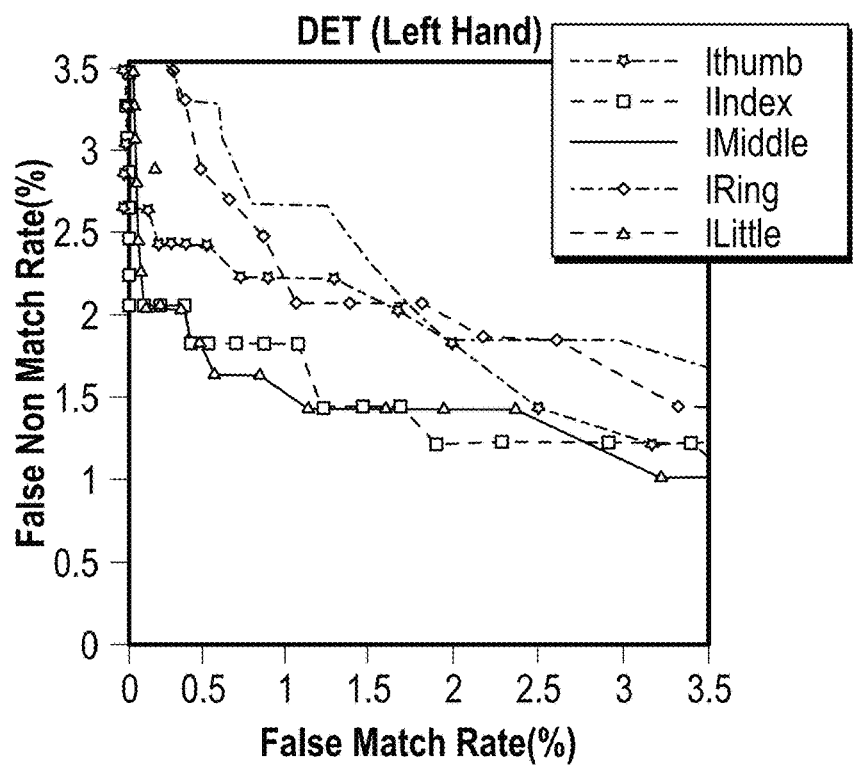
FIGS. 6A-B illustrate Detection Error Trade-off graphs for ten fingers according to one particular, non-limiting exemplary embodiment of the disclosed concept.
Figure 6B:
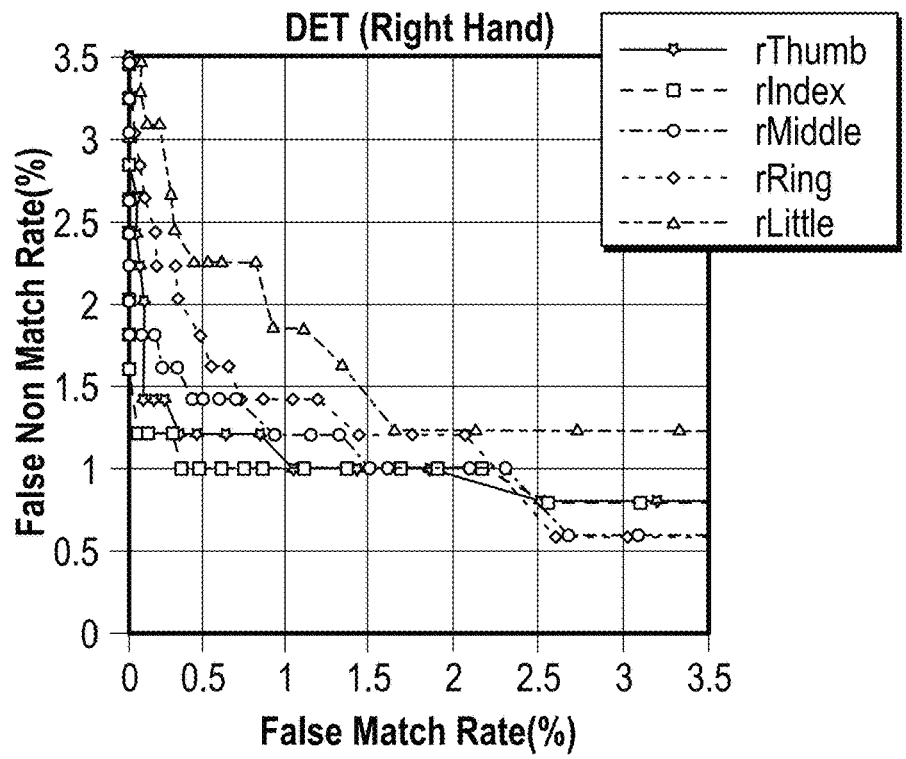

FIG. 5A illustrates quality measurement graphs A,B,C, D,E of five fingerprints of a test subject's right hand using NIST Fingerprint Image Quality (NFIQ 2.0) software. Graphs A,B,C,D,E indicate that right thumb and right index exhibit a better image quality than other fingers. FIG. 5B shows the probability distributions of the match scores obtained by comparing fingerprints belonging to the same test subject in both cross-finger and same-finger scenarios. In this graph, genuine match scores were generated by comparing same fingers (G) of the same subject, while the impostor scores were obtained by matching different fingers (F) of the same subject. There is a relatively small overlap area (H) between the two distributions. In the scientific literature, an analysis of cross-finger matching when the identity is the same is rarely carried out. The attack-resistance of a fingerprint system alone, expressed as the probability of successfully launching a brute-force attack, is 1 out of 100,000 attempts. The baseline fingerprint verification performance alone can be represented using the Detection Error Trade-off (DET) graph for all the ten fingers. FIGS. 6A-B show DET curves for a test subject's left hand 610 and for right hand 620, which plots FMR and FNMR as a function of the decision threshold, as shown in FIGS. 6A-B. For certain fingerprint instances such as left and right little fingers, the error rates are higher. Thus, the security of FingerPIN may be affected when those instances are chosen as components of the authentication sequence.

In general, the FingerPIN vulnerability analysis demonstrates its advantages over traditional multi-factor authentication, rather than vulnerabilities. In a brute-force attack against a traditional PIN, a randomly chosen five-digit sequence is guaranteed to be guessed in 100,000 attempts. A brute-force attack against a fingerprint system is an indirect attack, e.g., a brute force attack against the feature extractor input or to the matcher input. A False Match Rate (FMR) of 0.001% corresponds to the success of 1 out of 100,000 attempts by using a large number of different fingerprints. Generating or acquiring a large number of biometric samples is much more difficult and time-consuming than generating a large number of PINs. The number of attempts to brute-force a single fingerprint is typically in the same order of magnitude as the number of attempts to brute-force a 5-digit PIN, in addition to the fact that comparing two fingerprints is computationally more costly than comparing two 5-digit numbers.

In Scenario 1, the attacker has no knowledge about any fingerprint of genuine user. Given a FingerPIN, the probability P(Success) that a sequence of k arbitrary fingerprints presented by an attacker during a brute-force attack is successfully matched against the FingerPIN, allowing the attacker to achieve authentication. $P(FM_{ij})$ is the probability of False Match (FM) of the i-th fingerprint used by the attacker against the fingerprint mapped to digit j, and $P(F_{ij})$ is the probability that the i-th finger-digit maps to digit j, with $\Sigma_{j=0}^{9} P(F_{ij})=1$. When the system operates in the standard authentication mode (Mode 1), assuming that finger-digits are independent and equally distributed, P(Success) is given by:

$$P(\text{Success})=\Pi_{i=1}^{k} P(\text{Success})=\Pi_{i=1}^{k} \Sigma_{j=0}^{9} P(FM_{ij}) \cdot P(F_{ij}) \qquad \text{EQ. 1}$$

Regarding the term P(FM$_{ij}$), an empirical estimate of the probability with which the system incorrectly declares that a biometric sample belongs to the claimed identity when the sample belongs to a different subject (impostor) can be provided by the False Match Rate (FMR). FMR is typically selected based on the level of security required by the application and the corresponding threshold is set for the system.

It is clear from Eq. 1 that the probability of k random fingerprints matching k finger-digits is much smaller than the probability of k random digits matching a k-digit PIN. When the attacker does not have any genuine fingerprints available, knowledge of the secret mapping or the PIN would not help the attacker increase this probability.

In Scenario 2, how the probability P(Success) changes when one fingerprint is compromised is analyzed. The matching accuracy varies across different instances of an individual's fingerprints. A vulnerability in FingerPIN is found when the cross-instance match score is high for one or multiple fingerprint instances. In this case, the vulnerable instance can potentially be matched to more than one fingerprint, which makes the scheme less secure. The term non-zero effort attack here refers to the exploitation of any of the vulnerabilities present in a typical fingerprint system. P(NFM$_i^{SF}$) is the probability of Non Zero-Effort Attack Same-Finger False Match (NFM$_{SF}$) of the i-th fingerprint in the FingerPIN sequence, and P(NFM$_i^{CF}$) is the probability of Non Zero-Effort Attack Cross-Finger False Match (NFM$^{CF}$) of the i-th fingerprint when the stolen fingerprint is from a different finger than the one chosen in the FingerPIN sequence. Fs indicate the fingerprint stolen. When the system operates in the standard authentication mode (Mode 1), assuming that finger-digits are independent and equally distributed, P(Success) is given by:

$$P(\text{Success}) = \Pi_{i=1}^{k} \Sigma_{i=0}^{9} (P(F_{ij}F_{sj}) \cdot P(\text{NFM}_j^{SF}) + P(F_{ij}F_{s\neq j}) \cdot P(\text{NFM}_j^{CF}))$$ EQ. 2

If the secrecy of the mapping between fingers and digits is compromised, the probability of a successful brute-force attack can be simplified as follows:

$$P(\text{Success}) = \Pi_{i=1}^{k} \Sigma_{i=0}^{9} (P(F_{sj}) \cdot P(\text{NFM}_j^{SF}) + P(F_{s\neq j}) \cdot P(\text{NFM}_j^{CF}))$$ EQ. 3

In Scenario 3, the FingerPIN is guaranteed to be guessed in 10 k attempts—corresponding to all possible sequences of length k of the 10 fingerprints—requiring a total of 10k·k fingerprint comparisons. By contrast, a brute force attack against a traditional PIN would require only 10 k comparison between k-digit numbers. The secrecy of the mapping between the digits from 0 to 9 and the subject's fingers adds complexity to the scheme, making a brute-force attack more onerous. In fact, even when all fingerprints have been compromised, the attacker still needs to run a brute-force attack to compromise the FingerPIN, and every trial involves matching k fingerprints.

For Scenarios 2 ad 3, the system performance of verifying a legitimate user was further analyzed using the experimental results. Ten random 5-digit PINs with no repetitions were generated for every subject. For simplicity, the compromised fingerprint instance is assumed to be the same for all the authorized users. The FMR of the fingerprint system is 0.01%. Although such scenarios may seem critical, it is found that the attacker's success rate is very low. Results are summarized in Table 1. Cross-finger matches refer to comparisons between different fingerprint instances of the same subject. FM$^{CF}$ indicates the proportion of cross-finger matches wrongly accepted with respect to all cross-finger matches. Findings show that, with one compromised finger-digit, the additional four can guarantee a high level of protection. When the stolen fingerprint is the right index for all the subjects, only a few cross-finger false matches occur. The gallery was the right middle in 7 out of 8 false matches, while it was the left ring only in one case. These matches involved comparisons between fingerprints belonging to different subjects.

TABLE 1

Cross-finger false match rates for one stolen fingerprint (scenario 2)
Cross-Finger False March FM$^{CF}$ (%)

| Stolen Fp | Rx Thumb | Rx Index | Rx Middle | Rx Ring | Rx Little | L Thumb | L Index | L Middle | L Ring | L Little |
|---|---|---|---|---|---|---|---|---|---|---|
| Rx Thumb | — | 0.0037 | — | — | — | — | — | 0.0037 | 0.0037 | — |
| Rx Index | — | — | 0.0259 | — | — | — | — | — | 0.0037 | — |
| Rx Middle | — | 0.0111 | — | 0.0074 | 0.0074 | — | — | — | 0.0037 | — |
| Rx Ring | — | — | 0.0185 | — | — | — | — | — | — | — |
| Rx Little | — | 0.0037 | — | — | — | — | — | — | 0.0037 | — |
| L Thumb | — | — | 0.0037 | — | — | — | — | — | — | — |
| L Index | 0 0037 | — | 0.222 | — | — | — | — | — | 0.0037 | — |
| L Middle | — | 0.0074 | — | — | — | — | 0.0206 | — | 0.0111 | — |
| L Ring | 0.0037 | — | 0.0074 | — | — | — | 0.0111 | 0.0206 | — | — |
| L Little | — | — | — | — | — | — | — | — | — | — |

Findings also showed that, with two compromised finger-digits, the remaining three can guarantee robustness. When the stolen instance was the right thumb, only three cross-finger false matches among all the possible combinations were found. In two of these cases, the galleries were the right index and the left ring of the same subject, while in the third case the gallery was the left middle finger from a different subject. In this critical scenario, the proposed scheme would still be secure given the presence of the fifth component. Similar to the above, when the stolen fingerprint is the right middle finger for all the subjects, six cross-finger false matches were found. In two cases, the galleries were right index and right little fingers of the same subject, while in four cases the galleries were right index, right ring (twice) and left ring fingers from different individuals. When the compromised finger-digit was the right ring, the gallery was the right middle finger in 5 out of 6 cross-finger false matches. When the right little finger is stolen, results are similar to the scenario previously encountered with the difference that the galleries are from different subjects. Regarding the fingers of the left hand, with the left index fingerprint compromised, there were eight occurrences of cross-finger false matches, and in six of them, the left middle finger was the gallery. Among the remaining fingers, the left thumb showed less risk with only one cross-finger false match found while the left ring showed the highest risk, with 14 cross-finger false matches.

For the challenge authentication mode, the constraint of choosing a sequence without repetitions can be relaxed. The probabilities of repetitions of each stolen fingerprint are summarized in Table 2. The probability of choosing a given finger digit five times in the sequence is always zero. One stolen fingerprint is repeated twice in the FingerPIN sequence in about 7% of the cases, in which three cross-finger false matches should occur for a brute-force attack to succeed.

TABLE 2

Probability of repetitions for a given fingerprint instance.

| Stolen Fp | P(Rep = 1) | P(Rep = 2) | P(Rep = 3) | P(Rep = 4) | P(Rep = 5) | P(Rep) |
|---|---|---|---|---|---|---|
| Rx Thumb | 0.3300 | 0.0766 | 0.0088 | $4\ e^{-4}$ | 0 | 0.4158 |
| Rx Index | 0.3272 | 0.0732 | 0.0064 | $8\ e^{-4}$ | 0 | 0.4076 |
| Rx Middle | 0.3326 | 0.0768 | 0.0062 | $4\ e^{-4}$ | 0 | 0.4160 |
| Rx Ring | 0.3208 | 0.0730 | 0.0104 | 0 | 0 | 0.4042 |
| Rx Little | 0.3326 | 0.0660 | 0.0062 | $4\ e^{-4}$ | 0 | 0.4052 |
| L Thumb | 0.3324 | 0.0708 | 0.0082 | $4\ e^{-4}$ | 0 | 0.4118 |
| L Index | 0.3226 | 0.0792 | 0.0086 | $8\ e^{-4}$ | 0 | 0.4114 |
| L Middle | 0.3212 | 0.0758 | 0.0076 | $8\ e^{-4}$ | 0 | 0.4054 |
| L Ring | 0.3290 | 0.0706 | 0.0084 | $4\ e^{-4}$ | 0 | 0.4084 |
| L Little | 0.3266 | 0.0712 | 0.0084 | $6\ e^{-4}$ | 0 | 0.4068 |

In short, the experimental results demonstrate that FingerPIN is more secure than using fingerprints or PINs alone, even when one or more of a subject's fingerprints have been compromised. In scenarios where the attacker steals one fingerprint of the genuine user, the success rate of a brute-force attack against a 5-digit FingerPIN is practically zero. This result demonstrates how the integration of the two authentication factors considered in the present disclosure overcomes the limitations of both mechanisms, when used in isolation or sequentially.

Figure 7:
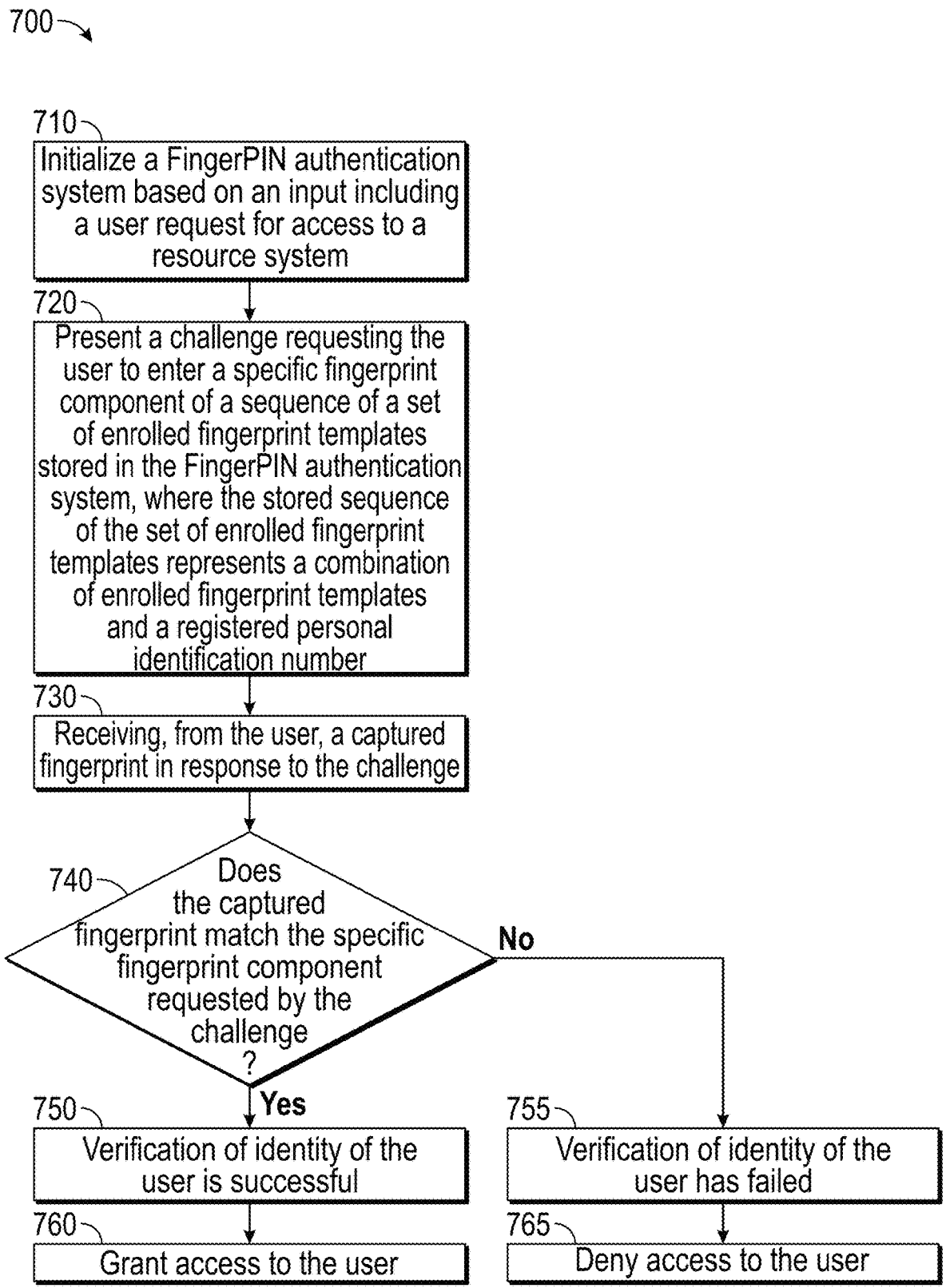
FIG. 7 is a flow chart for a method of authentication using FingerPIN according to one particular, non-limiting exemplary embodiment of the disclosed concept.

FIG. 7 is a flow chart for a method 700 of authentication of a user using FingerPIN for access to a resource system according to one particular, non-limiting exemplary embodiment of the disclosed concept. The method 700 may be performed by the FingerPIN authentication system 100 or any component thereof as described with reference to FIG. 1. The FingerPIN authentication system may be integrated in any device including a fingerprint sensor (e.g., without limitation a PC, a laptop, a biometric reader, a mobile device, a wearable device, etc.). The method 700 is a challenge authentication mode of the FingerPIN approach.

At 710, the FingerPIN authentication system is initialized based on an input. The input may include a user request for access to a resource system. The user request may be a simple touch applied by the user to a fingerprint sensor of the FingerPIN authentication system or a touch screen, if any, of the FingerPIN authentication system. The input may also include sensing the presence of the user near or in proximity to the FingerPIN authentication system. Such sensing may be made by a thermal or optical sensor coupled to the FingerPIN authentication system.

At 720, the FingerPIN authentication system presents a challenge requesting the user to enter a specific fingerprint component of a sequence of a set of enrolled fingerprint templates stored in an enrollment module or a trusted memory in the FingerPIN authentication system. In some cases, the stored sequence may be stored in an authorized user databased of the resource system. The challenge may be displayed in a display of an output apparatus of the FingerPIN authentication system or be audible via a speaker of the output apparatus of the FingerPIN authentication system. The stored sequence represents a combination of enrolled fingerprint templates and registered personal identification number (PIN) of the user.

At 730, the FingerPIN authentication system receives, from the user, a captured fingerprint in response to the challenge via the input apparatus (e.g., the input apparatus 120 as described with reference to FIG. 1).

At 740, the FingerPIN authentication system determines whether the captured fingerprint matches the specific fingerprint component requested by the challenge. If no, the method 700 proceeds to 755, and at 755 the FingerPIN authentication system decides that the verification of identity of the user has failed, and then at 765 the FingerPIN authentication system denies access to the user. In some cases, an output apparatus of the FingerPIN authentication system may alert the user that the verification has failed or access requested has been denied. If yes, the method 700 proceeds to 750.

At 750, the FingerPIN authentication system decides that the verification of identity of the user is successful.

At 760, the FingerPIN authentication system grants access to the user.

Figure 8:
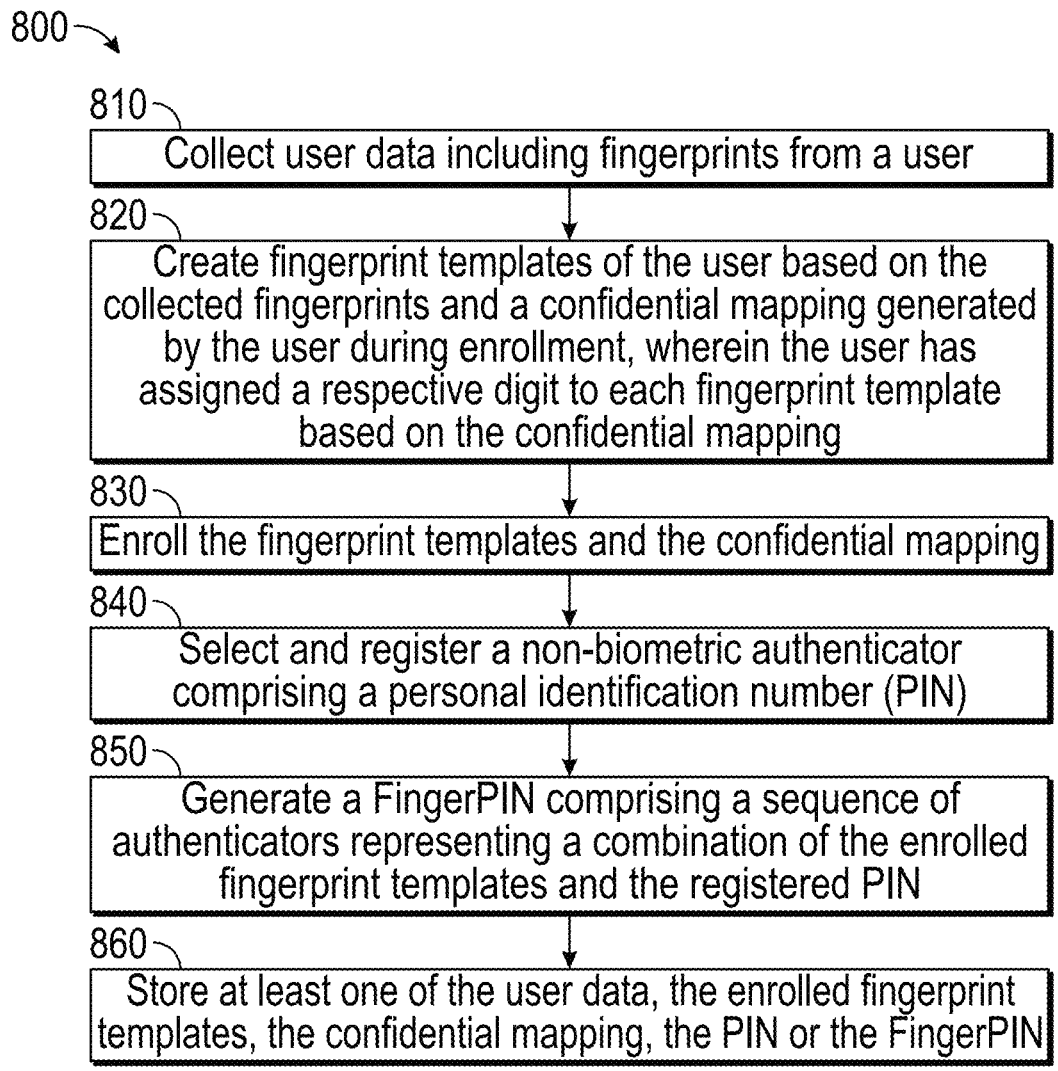
FIG. 8 is a flow chart for a method of creating a FingerPIN according to one particular, non-limiting exemplary embodiment of the disclosed concept.

FIG. 8 is a flow chart for a method 800 of generating a FingerPIN according to one particular, non-limiting exemplary embodiment of the disclosed concept. The method 800 may be performed by the FingerPIN authentication system 100 or any component thereof as described with reference to FIG. 1. In some cases, the enrollment and/or registration may occur at a command center of the resource system and thus the enrollment module and/or registration module may be located at the command center of the resource system. The enrollment module and the registration module may be a software, a firmware, a code, or a set of instructions integrated in the FingerPIN authentication system or in an enrollment or registration device (e.g., a P.C., a laptop, a biometric reader, etc.) located at the command center of the resource system.

At 810, the FingerPIN authentication system collects user data including fingerprints from a user.

At 820, the FingerPIN authentication system creates fingerprint templates of the user based on the collected fingerprints and a confidential mapping generated by the user, where the user has assigned a respective digit to each fingerprint template based on the confidential mapping.

At 830, the enrollment module enrolls the created fingerprint templates and the confidential mapping. In some examples, the initial confidential mapping is selected or generated by the user at enrollment, and thus, not predefined by the FingerPIN authentication system or the resource system. As such, the user retains control of the confidential mapping thereof and any updates or changes of the confidential mapping. In such examples, in order to enhance the additional security provided by the initial confidential mapping, it is discouraged to map each finger in a sequential manner easily discernable by an attacker (e.g., mapping left little finger to 0, left ring finger to 1, left middle finger to 2, left index finger to 3, left thumb to 4, right thumb to 5, right index finger to 6, right middle finger to 7, right ring finger to 8, and right little finger to 9).

At 840, the user selects and registers a non-biometric authenticator including a personal identification number (PIN). In some examples, the non-biometric authenticator may be other type of non-biometric authenticator (e.g., a password, etc.). The user also retains the control of the PIN and any updates or changes of the PIN.

At 850, the FingerPIN authentication system generates a FingerPIN including a sequence of authenticators representing a combination of the enrolled fingerprint templates and the registered PIN.

At 860, the FingerPIN authentication system stores at least one of the user data, the enrolled fingerprint templates, the confidential mapping, the PIN or the FingerPIN in the enrollment module, a trusted memory of the FingerPIN authentication system or a trusted part of the FingerPIN authentication system. In some examples, the user may update or change at least one of the confidential mappings, the PIN, or the FingerPIN in response to a compromise of the confidential mapping, the PIN or the FingerPIN detected or suspected by the FingerPIN authentication system, proactively as the user desires, or at predefined intervals.

Figure 9:
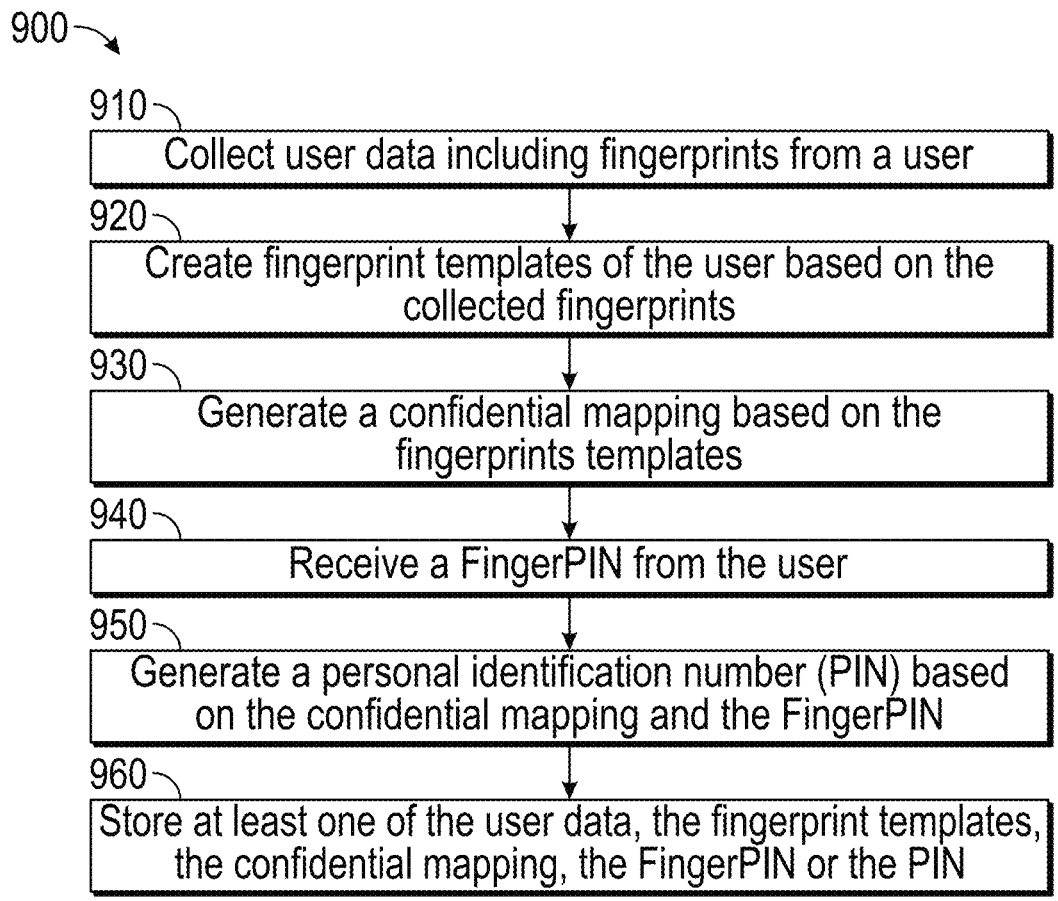
FIG. 9 is a flow chart for a method of creating a FingerPIN according to one particular, non-limiting exemplary embodiment of the disclosed concept.

FIG. 9 illustrates a method of creating a FingerPIN according to an example embodiment of the disclosed concept. The method 900 may be performed by the FingerPIN authentication system 100 or any component thereof as described with reference to FIG. 1.

At 910, the FingerPIN authentication system collects user data including fingerprints from a user.

At 920, the FingerPIN authentication system creates fingerprint templates of the user based on the collected fingerprints;

At 930, the FingerPIN authentication system generates a confidential mapping based on the fingerprints templates. The confidential mapping randomly assigns respective digits to the fingerprint templates.

At 940, the FingerPIN authentication system receives from the user a FingerPIN comprising a sequence of fingerprints having corresponsive respective digits.

At 950, the FingerPIN authentication system generates a personal identification number (PIN) based on the confidential mapping and the FingerPIN. The FingerPIN authentication system may change or update the confidential mapping or the PIN in response to a compromise detected or suspected by the FingerPIN authentication system. If the FingerPIN need not be changed, then only the confidential mapping is changed and the PIN is inferred from the existing PIN and the new confidential mapping. If the FingerPIN needs to be changed without having to change the confidential mapping, then the FingerPIN authentication system transmits a message to the user via a communication channel (e.g., emails, text messages, etc.) prompting the user to change the FingerPIN. The user may create a new FingerPIN, and the FingerPIN authentication system generates a new PIN inferred based on the new FingerPIN and the existing confidential mapping. If both the confidential mapping and the FingerPIN need to be changed, the method 900 is repeated.

At 960, the FingerPIN authentication system stores at least one of the user data, the fingerprint templates, the confidential mapping, the FingerPIN or the PIN.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of authenticating a user using a multi-factor authentication system for access to a resource system, comprising:
    initializing the multi-factor authentication system based on an input;
    presenting a challenge requesting the user to enter a specific authenticator of a sequence of authenticators stored in the multi-factor authentication system, wherein the stored sequence of authenticators comprises a plurality of authentication factors;
    receiving an authenticator from the user in response to the challenge;
    verifying identity of the user by determining whether the received authenticator matches the specific authenticator requested by the challenge; and
    granting the access based on a determination that the received authenticator matches the specific authenticator requested, or denying the access based on a determination that the received authenticator does not match the specific authenticator requested.

2. The method of claim 1, wherein the sequence of authenticators is a FingerPIN, and the plurality of authentication factors comprises a combination of enrolled fingerprint templates and personal identification (PIN) for the user.

3. The method of claim 2, wherein the combination of the enrolled fingerprint templates and the PIN comprises:
    a confidential mapping that is generated by assignment, by the user during enrollment, of respective numeric digits to the enrolled fingerprint templates;
    the PIN comprising a set of the respective numeric digits arranged in a sequence chosen by the user during registration; and
    the FingerPIN generated by the user based on the confidential mapping and the PIN, wherein the FingerPIN comprises a set of the enrolled fingerprint templates having same numeric digits as the set of the respective numeric digits arranged in the chosen sequence of the PIN.

4. The method of claim 3, wherein at least one of the confidential mapping or the PIN is changed by the user upon a lapse of a predefined period, in response to a compromise of at least the confidential mapping or the PIN, or at any time.

5. The method of claim 2, wherein the received authenticator is a fingerprint of the user captured by a sensor, and verifying the identity of the user requires a simultaneous proof of validity of the captured fingerprint of the user and user knowledge of the sequence of authenticators.

6. The method of claim 2, wherein the combination of the enrolled fingerprint templates and the PIN comprises:
- a confidential mapping that is generated by assignment, by the multi-factor authentication system, of respective numeric digits to;
- the FingerPIN received from the user during registration, the Finger PIN comprising a sequence of fingerprints having corresponsive respective numeric digits based on the confidential mapping; and
- the PIN generated, by the multi-factor authentication system, the PIN comprising a set of numeric digits arranged in the order of the corresponsive respective numeric digits based on the FingerPIN and the confidential mapping.

7. The method of claim 6, wherein the confidential mapping and the PIN remain confidential and not disclosed to the user.

8. The method of claim 6, wherein the confidential mapping is changed by the multi-factor authentication system proactively or in response to a compromise of at least one of the confidential mapping or the PIN, and the PIN is changed based on the changed confidential mapping and the FingerPIN.

9. The method of claim 6, wherein the Finger PIN is changed by the user upon receiving a prompt to generate a new FingerPIN based on a determination that a change to the FingerPIN is needed.

10. The method of claim 6, wherein based on a determination that both the confidential mapping and the Finger PIN are needed to be changed, the combination of the enrolled fingerprint templates and PIN comprises:
- a new confidential mapping generated by the multi-factor authentication system, by assignment of new respective numeric digits to the enrolled fingerprint templates;
- a new FingerPIN received from the user; and
- a new PIN generated based on the new confidential mapping and the new FingerPIN, the new PIN comprising a set of new numeric digits arranged in the order of new corresponsive respective numeric digits of the Finger PIN.

11. A method of creating a multi-factor authenticator using a multi-factor authentication system, comprising:
- collecting user data including a plurality of biometric authenticators from a user;
- creating biometric authenticator templates of the user based on the collected biometric authenticators;
- assigning a confidential mapping of numeric digits to the biometric authenticator templates;
- receiving from the user a sequence of authenticators chosen from the collected biometric authenticators as the multi-factor authenticator; and
- generating a Type 1 authenticator based on the confidential mapping and the sequence of the multi-factor authenticators, the Type 1 authenticator comprising a personal identification number (PIN),
wherein the confidential mapping and the Type 1 authenticator remain confidential and are not disclosed to the user.

12. The method of claim 11, wherein the biometric authenticator templates comprise collected fingerprints of the user, the confidential mapping comprises collected fingerprints randomly assigned to respective numeric digits; and the received multi-factor authenticator is a FingerPIN comprising a sequence of fingerprints having corresponsive respective numeric digits based on the confidential mapping.

13. The method of claim 12, wherein the confidential mapping is changed by the multi-factor authentication system proactively or in response to a compromise of at least one of the confidential mapping or the PIN, and the PIN is changed based on the changed confidential mapping and the Finger PIN.

14. The method of claim 12, wherein the FingerPIN is changed by the user upon receiving a prompt to generate a new FingerPIN based on a determination that a change to the FingerPIN is needed and the PIN is changed based on the new FingerPIN and the confidential mapping.

15. The method of claim 12, wherein based on a determination that both the confidential mapping and the Finger PIN are needed to be changed and the method further comprises:
- assigning a new confidential mapping of new respective numeric digits to the enrolled fingerprint templates;
- receiving a new FingerPIN from the user; and
- generating a new PIN based on the new confidential mapping and the new FingerPIN, the new PIN comprising a set of new numeric digits arranged in the order of new corresponsive respective numeric digits of the Finger PIN.

16. A multi-factor authentication system for authenticating a user for access to a resource system, comprising:
- a. an input apparatus configured to receive an input comprising an authenticator, the input apparatus comprising a biometric sensor;
- b. an output apparatus configured to output at least a challenge requesting the user to enter a specific authenticator in a sequence of authenticators stored in an enrollment module or a trusted memory of the multi-factor authentication system, the stored sequence of authenticators comprises a plurality of authentication factors;
- c. a control system coupled to the input apparatus and the output apparatus, the control system comprising the enrollment module configured to enroll and store biometric authenticator templates of the user, a registration module configured to register at least a non-biometric authentication factor, and an authentication module configured to:
  - i. verify identity of the user based at least in part on a determination that the authenticator received in response to the challenge is the same as the requested specific authenticator of the stored sequence of the authenticators; and
  - ii. grant the access to the user based on a successful verification of the identity of the user, or deny the access to the user based on a failure to verify the identity of the user; and
- d. a communication module coupled to the resource system and configured to at least transmit or receive data from the resource system via wired or wireless communications technologies upon granting of the access.

17. The multi-factor authentication system of claim 16, wherein the biometric authenticator templates are enrolled fingerprint templates of the user, the non-biometric authentication factor is a personal identification number (PIN), the sequence of the authenticators is a Finger PIN and the enrollment module is further configured to enroll a confidential mapping in which the user has assigned respective numeric digits to the enrolled fingerprint templates, the PIN comprising a set of the respective numeric digits in a sequence chosen by the user and the FingerPIN comprising a sequence of fingerprints including corresponsive numeric digits based on the confidential mapping and the PIN, the corresponsive numeric digits having the same sequence as the chosen sequence.

18. The multifactor authentication system of claim 16, wherein the biometric authenticator templates are enrolled fingerprint templates of the user, the non-biometric authentication factor is a personal identification number (PIN), the sequence of the authenticators is a Finger PIN comprising a sequence of fingerprints having respective numeric digits, the FingerPIN having been entered by the user during the enrollment, the enrollment module is further configured to assign a confidential mapping of respective numeric digits to the enrolled fingerprint templates, and the registration module is further configured to generate the PIN based on the confidential mapping and the FingerPIN.

\* \* \* \* \*

UNITED STATES PATENT AND TRADEMARK OFFICE
CERTIFICATE OF CORRECTION

PATENT NO. : 11,997,085 B2
APPLICATION NO. : 17/670590
DATED : May 28, 2024
INVENTOR(S) : Emanuela Marasco et al.

Page 1 of 1

It is certified that error appears in the above-identified patent and that said Letters Patent is hereby corrected as shown below:

In the Claims

Column 25, Claim 6, Lines 13-16, replace "a confidential mapping that is generated by assignment, by the multi-factor authentication system, of respective numeric digits to;" with --a confidential mapping that is generated by assignment, by the multi-factor authentication system, of respective numeric digits to the enrolled fingerprint templates;--

Signed and Sealed this
Twentieth Day of August, 2024

Katherine Kelly Vidal
*Director of the United States Patent and Trademark Office*